United States Patent
Venkatachalam et al.

(10) Patent No.: US 12,014,154 B2
(45) Date of Patent: Jun. 18, 2024

(54) SOFTWARE PROCESS MODIFICATION PLATFORM FOR COMPLIANCE

(71) Applicant: PAYPAL, INC., San Jose, CA (US)

(72) Inventors: Sneha Venkatachalam, San Jose, CA (US); Ravi Retineni, Fremont, CA (US); Hang Yu, Shanghai (CN); Zhaoyang Wang, Shanghai (CN); Yi Ren, Shanghai (CN); Zihao Zhao, Shanghai (CN); Huiting Li, Shanghai (CN); Gaoyuan Wang, San Jose, CA (US); Li Cao, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 666 days.

(21) Appl. No.: 17/206,968

(22) Filed: Mar. 19, 2021

(65) Prior Publication Data

US 2022/0283783 A1    Sep. 8, 2022

(30) Foreign Application Priority Data

Mar. 5, 2021    (WO) ................ PCT/CN2021/079331

(51) Int. Cl.
*G06F 8/10*    (2018.01)
*G06F 3/0482*    (2013.01)
(Continued)

(52) U.S. Cl.
CPC .............. *G06F 8/10* (2013.01); *G06F 3/0482* (2013.01); *G06F 8/20* (2013.01); *G06F 8/30* (2013.01);
(Continued)

(58) Field of Classification Search
CPC ... G06F 21/54; G06F 8/10; G06F 8/20; G06F 8/34; G06N 20/00; G06N 20/20; G06Q 50/26
See application file for complete search history.

(56) References Cited

U.S. PATENT DOCUMENTS 10,423,709 B1 *   9/2019   Bradley ................ G06F 40/103
10,592,634 B1     3/2020   Baranwal et al.
(Continued)

FOREIGN PATENT DOCUMENTS

CN    111898159 A    11/2020
CN    112232088 A    1/2021

*Primary Examiner* — Olugbenga O Idowu
(74) *Attorney, Agent, or Firm* — Haynes and Boone, LLP

(57) ABSTRACT

Methods and systems are presented for providing a computer platform that manages the impacts of government regulations on existing software processes of an online service provider. A regulation document is obtained from a government agency. The regulation document is processed, and legal obligations relevant to an online service provider are extracted from the regulation document. An ensemble machine learning model is used to recommend, for each of the legal obligations, software controls that can be implemented within one or more software processes of the online service provider to mitigate a risk of the legal obligations. The ensemble machine learning model may include an attribute-based model and a text-based model. An explainable visual interface is provided to present the recommended software controls and context that indicates to a user how the software controls are determined for the legal obligations.

20 Claims, 13 Drawing Sheets

(51) Int. Cl.
 *G06F 8/20* (2018.01)
 *G06F 8/30* (2018.01)
 *G06F 8/34* (2018.01)
 *G06F 16/93* (2019.01)
 *G06F 21/54* (2013.01)
 *G06N 5/04* (2023.01)
 *G06N 20/00* (2019.01)
 *G06N 20/20* (2019.01)
 *G06Q 30/018* (2023.01)
 *G06Q 50/26* (2012.01)

(52) U.S. Cl.
 CPC ............... *G06F 8/34* (2013.01); *G06F 16/93* (2019.01); *G06F 21/54* (2013.01); *G06N 5/04* (2013.01); *G06N 20/00* (2019.01); *G06N 20/20* (2019.01); *G06Q 30/018* (2013.01); *G06Q 50/26* (2013.01)

(56) References Cited

U.S. PATENT DOCUMENTS

| | | |
|---|---|---|
| 10,872,206 B2 * | 12/2020 | Snyder ............... G06N 3/088 |
| 2006/0123364 A1 | 6/2006 | Cook et al. |
| 2014/0053069 A1 | 2/2014 | Yan |
| 2020/0090059 A1 * | 3/2020 | Kim ............... G06F 40/205 |
| 2021/0248514 A1 | 8/2021 | Cella et al. |
| 2022/0035342 A1 | 2/2022 | Cella et al. |

\* cited by examiner

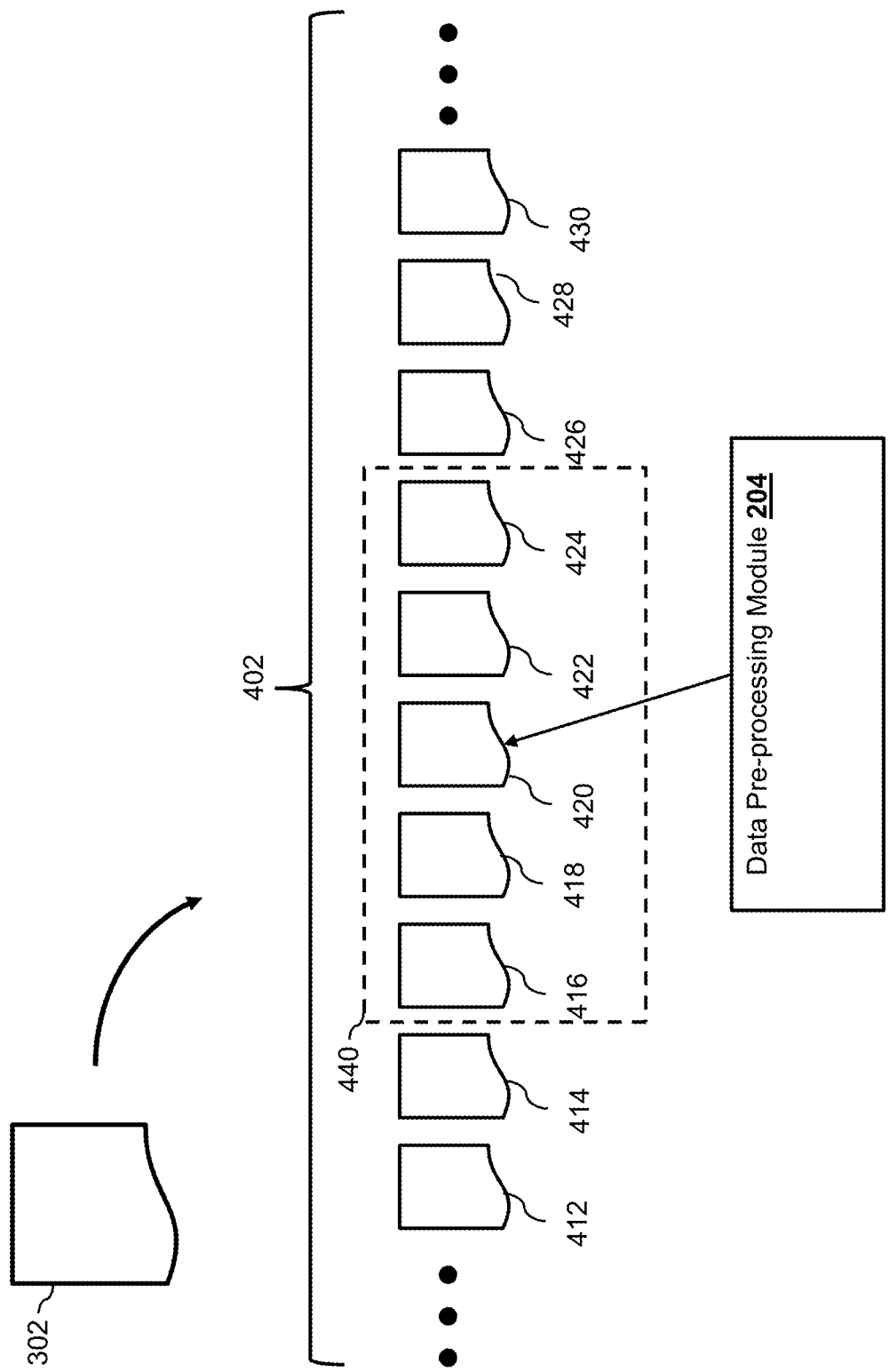

SOFTWARE PROCESS MODIFICATION PLATFORM FOR COMPLIANCE

CROSS-REFERENCE TO RELATED APPLICATIONS

This application claims priority to and the benefit of International Patent Application No. PCT/CN2021/079331, filed on Mar. 5, 2021, the contents of which are hereby incorporated by reference herein in its entirety.

BACKGROUND

The present specification generally relates to management of software processes, and more specifically, to dynamically implementing software controls in one or more software processes according to various embodiments of the disclosure.

RELATED ART

An online service provider can use an online software platform for providing a variety of online services to its users. The online software platform may interact with the users through an electronic user interface. For example, the online software platform may obtain information of the users through the electronic user interface, and may perform transactions (e.g., purchase transactions, payment transactions, banking transactions, user onboarding transactions, content delivery or access transactions, etc.) for the users based on the obtained information. Since the online software platform is not limited to providing services in a specific geographical region, the user population of the online service provider can span across multiple countries or jurisdictions.

Some or all of the services provided by the online software platform may be subject to government regulations from different countries. For example, storing and processing of sensitive data (e.g., personal identifiable data such as addresses, social security numbers, passwords, etc., financial data such as credit card numbers, etc., health data such as health history, prognosis data, etc.) obtained from the users may be subject to government regulations related to data privacy, and processing and/or otherwise handling of financial transactions may be subject to financial regulations. These regulations may be issued by different government agencies (e.g., Securities and Exchange Commission (SEC), Electronic Privacy Information Center (EPIC), etc.) and from different jurisdictions (e.g., United States, Canada, Brazil, Europe, China, Japan, etc.). In order to comply with these regulations (or to mitigate the risk of violating these regulations), modifications (also referred to as "controls" or "software controls") may be implemented within one or more of the software processes associated with the online software platform. However, determining which software processes of the online software platform are impacted by a new regulation, and determining the necessary controls to be implemented in the software processes for mitigating the risk associated with the new regulation can be burdensome and technically challenging to automate. Though, with new regulations or changes to existing regulations occurring frequently, the online service provider needs to act swiftly to implement the necessary controls in the software processes in order to remain in compliance with the laws of different jurisdictions. As such, there is a need for providing a computer-based platform for assisting an online service provider in handling government regulations that impact its computer software processes.

SUMMARY

In one aspect of the disclosure, a system is presented. The system comprises a non-transitory memory; and one or more hardware processors coupled with the non-transitory memory and configured to read instructions from the non-transitory memory to cause the system to perform operations. The operations includes receiving data associated with a first obligation; predicting, using one or more machine learning models, a set of controls implementable in a software process of an online service provider for mitigating a risk associated with non-compliance of the first obligation, wherein the set of controls is determined based in part on a set of different obligations that share common attributes with the first obligation; and presenting, on a user device, a graphical user interface (GUI) comprising at least three layers of graphical elements for illustrating how the set of controls were predicted, wherein a first layer of the GUI comprises a graphical element representing the first obligation, wherein a second layer of the GUI, adjacent to the first layer, comprises a plurality of obligation graphical elements representing the set of different obligations that shares common attributes with the first obligation, and wherein a third layer of the GUI, adjacent to the second layer, comprises a plurality of control graphical elements representing the set of controls predicted to mitigate the risk associated with non-compliance of the first obligation.

In another aspect of the disclosure, a method is presented. The method includes the steps of receiving, by one or more hardware processors, data associated with a new or revised regulation; determining, based on the data, a first obligation that impacts a process performed by an online service provider; determining, by the one or more hardware processors using an ensemble machine learning model, a set of different obligations that share common attributes with the first obligation; recommending, by the one or more hardware processors, a set of controls implementable in a software process of an online service provider for mitigating a risk associated with non-compliance of the first obligation based on the set of different obligations; and presenting, on a user device, the recommended set of controls in an visual presentation, wherein the visual presentation comprises a multi-tier layout, wherein a first tier in the multi-tier layout comprises a graphical element representing the first obligation, wherein a second tier in the multi-tier layout, adjacent to the first tier, comprises a plurality of obligation graphical elements representing the set of different obligations that shares common attributes with the first obligation, and wherein a third tier in the multi-tier layout, adjacent to the second tier, comprises a plurality of control graphical elements representing the set of controls predicted to mitigate the risk associated with non-compliance of the first obligation.

In another aspect of the disclosure, a non-transitory machine-readable medium is presented. The non-transitory machine-readable medium stores machine-readable instructions executable to cause a machine to perform operations. The operations includes receiving data associated with a first obligation; predicting, using one or more machine learning models, a set of controls implementable in a software process of an online service provider for mitigating a risk associated with non-compliance of the first obligation, wherein the set of controls is determined based in part on a set of different obligations that share common attributes with the first obligation; and presenting, on the user device, a graphical user interface (GUI) comprising a three-tier layout, wherein a first tier of the three-tier layout comprises a graphical element representing the first obligation, wherein a second tier of the three-tier layout, adjacent to the first tier, comprises a plurality of obligation graphical elements representing the set of different obligations that shares common attributes with the first obligation, and wherein a third tier of the three-tier layout, adjacent to the second tier, comprises a plurality of control graphical elements representing the set of controls predicted to mitigate the risk associated with non-compliance of the first obligation.

In another aspect of the disclosure, a system is presented. The system comprises a non-transitory memory; and one or more hardware processors coupled with the non-transitory memory and configured to read instructions from the non-transitory memory to cause the system to perform operations. The operations includes obtaining first data associated with a first obligation, wherein the first data comprises (i) text data and (ii) a set of attributes corresponding to a set of attribute types and associated with the first obligation; analyzing the first data associated with the first obligation and second data associated with a plurality of stored obligations for which a plurality of controls has been implemented in one or more software processes to mitigate risks associated with the plurality of stored obligations; determining, from the plurality of stored obligations, a subset of stored obligations based on a result of the analyzing; identifying, from the plurality of controls, one or more controls that have been implemented in one or more software processes to mitigate risks associated with the subset of stored obligation as control candidates for the first obligation; and providing, on the user device, a graphical user interface (GUI) that displays the control candidates for the first obligation.

In another aspect of the disclosure, a method is presented. The method includes the steps of extracting, by one or more hardware processors, a first obligation from a regulation document comprising text data; determining, by the one or more hardware processors for the first obligation, first data comprising (i) a portion of the text data corresponding to the first obligation and (ii) a set of attributes corresponding to a set of attribute types and associated with the first obligation; performing, by the one or more hardware processors, a plurality of analyses, on the first data associated with the first obligation and second data associated with a plurality of stored obligations for which a plurality of software controls has been implemented in one or more software processes to mitigate risks associated with the plurality of stored obligations; determining, by the one or more hardware processors from the plurality of stored obligations, a subset of stored obligations based on a result of performing the plurality of analyses; identifying, by the one or more hardware processors from the plurality of software controls, one or more software controls that have been implemented in one or more software processes to mitigate risks associated with the subset of stored obligation as control candidates for the first obligation; and providing, by the one or more hardware processors on the user device, a graphical user interface (GUI) that displays the control candidates for the first obligation.

In another aspect of the disclosure, a non-transitory machine-readable medium is presented. The non-transitory machine-readable medium stores machine-readable instructions executable to cause a machine to perform operations. The operations includes obtaining first data associated with a first obligation, wherein the first data comprises (i) text data extracted from a document and (ii) a set of attributes corresponding to a set of attribute types and associated with the first obligation; analyzing the first data associated with the first obligation and second data associated with a plurality of stored obligations for which a plurality of controls has been implemented in one or more software processes of an online service provider to mitigate risks associated with the plurality of stored obligations; determining, from the plurality of stored obligations, a subset of stored obligations based on a result of the analyzing; identifying, from the plurality of controls, one or more controls that have been implemented in one or more software processes to mitigate risks associated with the subset of stored obligation as control candidates for the first obligation; and providing, on the user device, a graphical user interface (GUI) that displays the control candidates for the first obligation.

In another aspect of the disclosure, a system is presented. The system comprises a non-transitory memory; and one or more hardware processors coupled with the non-transitory memory and configured to read instructions from the non-transitory memory to cause the system to perform operations. The operations includes obtaining a document comprising text in a plurality of pages; converting the text in the plurality of pages into a string of text; parsing the converted text; determining a hierarchical structure based on the parsing, wherein the hierarchical structure comprises a plurality of sections and a plurality of sub-sections; mapping different portions of the converted text to different sections of the plurality of sections and different subsections of the plurality of sub-sections of the hierarchical structure; providing, to a machine learning model, the portion of the converted text and data indicating a section and a subsection within the hierarchical structure associated with the portion of the converted text; obtaining results from the machine learning model in response to the providing; and determining whether each portion of the converted text represents an obligation that is relevant to an online service provider based on the results.

In another aspect of the disclosure, a method is presented. The method includes the steps of obtaining a document comprising text in a plurality of pages; pre-processing the document, wherein the pre-processing comprises removing at least a portion of the text from the plurality of pages; determining a hierarchical structure based on the pre-processed document, wherein the hierarchical structure comprises a plurality of sections and a plurality of sub-sections; mapping different portions of the document to different sections of the plurality of sections and different subsections of the plurality of sub-sections of the hierarchical structure; and determining, using a machine learning model, whether each portion of the document represents an obligation that is relevant to an online service provider based on text data corresponding to the portion of the document and data indicating a section and a subsection within the hierarchical structure associated with the portion of the document.

In another aspect of the disclosure, a non-transitory machine-readable medium is presented. The non-transitory machine-readable medium stores machine-readable instructions executable to cause a machine to perform operations. The operations includes obtaining a document comprising text in a plurality of pages; pre-processing the text in the plurality of pages; determining a hierarchical structure based on parsing the pre-processed text, wherein the hierarchical structure comprises a plurality of sections and a plurality of sub-sections; mapping different portions of the pre-processed text to different sections of the plurality of sections and different subsections of the plurality of sub-sections of the hierarchical structure; and determining, using a machine learning model, whether each portion of the converted text represents an obligation that is relevant to an online service provider based on the portion of the pre-processed text and data indicating a section and a subsection within the hierarchical structure associated with the portion of the pre-processed text.

BRIEF DESCRIPTION OF THE FIGURES

FIGS. 4A-4D illustrate processing pages of a regulation document using different sliding window techniques according to an embodiment of the present disclosure;

Figure 1:
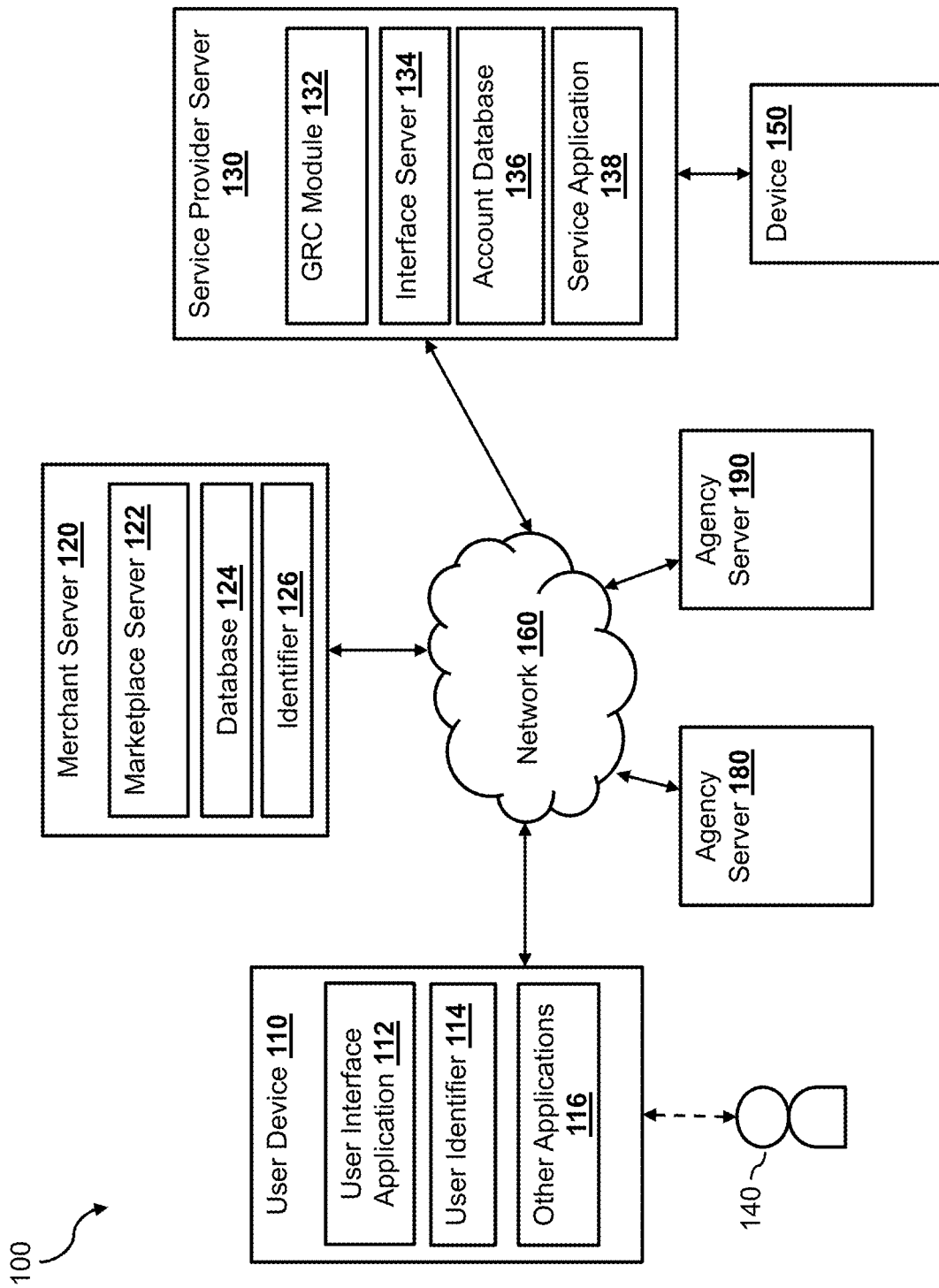
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a computer platform that manages impacts of government regulations on existing software processes of an online service provider. As discussed above, new government regulations and/or changes to existing government regulations can be promulgated by various government agencies frequently. Each new government regulation or each change to an existing regulation may have an impact on how the online service provider performs its operations, such as processing electronic transactions, processing and/or storing electronic data, triggering reports to third-parties (e.g., a government agency, a law enforcement agency, etc.), or any other ways of operating its business. In order to comply with the new government regulation or the change to the existing regulation, the online service provider may have to first understand the regulation and what legal obligations (also referred to as "obligations") are imposed by the regulation. The online service provider may then determine whether the legal obligations are relevant to the online service provider (in other words, have an impact on the way that the online service provider performs its operations such that the online service provider would need to change its operations in some way to comply). For example, the regulation may restrict sales of certain items (e.g., firearms, drugs, etc.) at a certain geographical region (e.g., a particular state, a particular country, etc.). In another example, the regulation may impose a more stringent authentication process (e.g., a two-factor authentication, a biometric verification, etc.) for processing certain electronic transactions (e.g., fund transfer transactions, etc.). In yet another example, the regulation may require a minimum data encryption level (e.g., a minimum number of bits required for an encryption key, etc.) for transmitting and/or storing certain types of data (e.g., financial data such as account numbers, etc.).

When the online service provider determines that the legal obligations are relevant to the online service provider (e.g., the online service provider processes purchase transactions related to the restricted items, the online service provider processes the types of electronic transactions being regulated, the online service provider processes and/or stores the types of data being regulated, etc.), the online service provider may determine which software processes (e.g., software modules) are impacted by the legal obligations. For example, when the legal obligations restrict sales of certain items in a particular geographical region, the online service provider may determine that the software processes configured to facilitate purchase transactions in the particular geographical region will be impacted by the legal obligations. When the legal obligations require a particular authentication process for processing certain electronic transactions, the online service provider may determine that the software processes configured to authenticate users for processing the certain electronic transactions will be impacted by the legal obligations. When the legal obligations require a minimum data encryption level for processing and/or storing certain types of data, the online service provider may determine that the software processes configured to process and/or store the certain types of data will be impacted by the legal obligations.

The online service provider may then modify the software processes that are impacted by the legal obligations. For example, the online service provider may generate software controls (e.g., software code written in a particular programming language that includes logic to implement a particular modification based on the one or more legal obligations) and implement the software controls into the software processes. The incorporation of the software controls into the software processes would mitigate the risk of non-compliance of the regulations, as the software controls change how the online service provider processes certain transactions and/or data in a way to comply with the regulations. Conventionally, since the translations from the regulation text to specific legal obligations, the mapping of legal obligations to specific software processes impacted by the legal obligations, and the implementation of software controls require extensive knowledge in multiple domains (e.g., laws, computer technology, a company's internal structure, etc.), they are usually performed manually by multiple personnel from teams across multiple domains. For example, a legal officer of the online service provider may read the regulation text in full to determine one or more legal obligations imposed by the regulation. The regulation often includes a large volume of text (e.g., hundreds of pages, etc.) that requires substantial amount of time for the legal officer to read through. The legal officer may determine, based on his/her knowledge about the law and the online service provider, and on his/her understanding of the regulation, whether the one or more legal obligations are relevant to the online service provider. If it is determined that the one or more legal obligations are relevant to the online service provider, the legal officer may pass the one or more legal obligations to different business teams to determine which business processes are impacted by the one or more legal obligations. The personnel of the different business teams (e.g., the managers) may determine if their business processes are impacted by the legal obligations, and if so, may request the software development teams that are responsible for developing the software processes that implement the business processes to modify the software processes. The managers or developers of the software development teams may then create and incorporate software controls into the software processes (e.g., incorporating the software controls into programming code associated with the software processes) to mitigate the risk associated with the legal obligations. As one can see, the process of managing risks associated with the legal obligations can be burdensome that involves many people and departments within an organization. Furthermore, the manual involvements of different personnel and teams of the online service provider in managing the impacts of regulations can be error prone, and the potential non-compliance of regulations can result in dire consequences for the online service provider, such as fines, suspensions of service, and even a shutting down of the business.

Thus, according to various embodiments of the disclosure, a computer platform may facilitate the compliance of government regulations for the online service provider through automatic ingestion of government regulations, identification of software processes being impacted by the regulations, recommendations of software controls that can be implemented within the software processes, and providing an explainable visual interface that illustrates how the recommended software controls are determined. In some embodiments, a data ingestion module of the computer platform may be configured to ingest new regulations or changes to existing regulations, and extract legal obligations that are relevant to the online service provider (e.g., ones that may require a process change by the online service provider) from the new regulations or changes to existing regulations. For example, the data ingestion module may monitor any new regulations or changes to regulations from government agencies across multiple jurisdictions. The data ingestion module may access servers associated with the government agencies (e.g., crawling their websites, etc.) to detect any new regulations or changes to regulations that have been promulgated. When a new regulation or a change to a regulation is detected, the data ingestion module may retrieve a document corresponding to the new regulation or the change to the regulation.

The document associated with a regulation may include a large volume of text (e.g., hundreds of pages of text) and may specify multiple rules (referred to as "legal obligations" or "obligations"). In some embodiments, the data ingestion module may automatically extract legal obligations from the text. To extract the legal obligations, the data ingestion module may first identify irrelevant text such as headers and/or footers, and remove the irrelevant text. For example, headers and footers are not part of the document itself, but are placed (usually on the top margin and the bottom margin of each page of the document) to provide additional information to a reader, such as a page number, a name of the document, a name of the current section within the document, etc. As such the headers and footers of the text are often irrelevant to the regulation itself.

In some embodiments, the data ingestion module may identify headers and footers of the document by using a sliding window technique. Using the sliding window technique, the data ingestion module may traverse the document one page at a time. At each particular page of the document, the data ingestion module may access text from neighboring pages (e.g., pages that are prior to and subsequent to the page, etc.) within the sliding window. In some embodiments, the sliding window may include adjacent pages (e.g., 3 pages, 5, pages, 7 pages, etc.) preceding and/or succeeding the particular page. In some embodiments, the sliding window may include alternate pages (e.g., every other page, every two pages, etc.) preceding and/or succeeding the particular page.

The data ingestion module may then analyze the top and/or bottom lines (e.g., the top 3 lines, the top 5 lines, etc.) of text from the pages within the sliding window. In some embodiments, the data ingestion module may compare the text from the top and/or bottom lines of the particular page against the text from the top and/or bottom lines of each of the other pages within the sliding window. The data ingestion module may determine that a line of text in the particular page likely corresponds to a header or a footer based on the comparison. For example, the data ingestion module may determine that a line of text in the particular page likely corresponds to a header or a footer when the comparisons between the line of text in the particular page and the lines of text in the other pages in the sliding window exceeds a predetermine similarity threshold. In some embodiments, the data ingestion module may also analyze font attributes and textual attributes (e.g., alpha-numerical arrangements) of each line of text in the page to determine whether the line of text corresponds to a header or footer. The data ingestion module may then remove the line(s) of text in the particular page that are determined to be part of a header or footer from the text. The data ingestion module may then append the text from each page together to form a continuous, uninterrupted piece of text document.

After pre-processing the text, the data ingestion module may extract portions of the text corresponding to different legal obligations based on a hierarchical structure of the text. As discussed herein, a regulation may include laws and rules corresponding to multiple legal obligations, where each legal obligation specifies a distinct requirement. For example, the regulation may include multiple sections and subsections. Some of the sections or subsections (e.g., a "background" section) may not correspond to a legal obligation, while some of the sections or subsections (e.g., "encryption requirement" section) may correspond to a legal obligation.

In some embodiments, the data ingestion module may determine the hierarchical structure of the document based on parsing the text of the document. For example, the data ingestion module may identify a table of content section of the document based on a recognized pattern of a portion of the text (e.g., a layout of the text, font characteristics, alpha-numerical arrangements of the text, etc.) that corresponds to a table of content. The data ingestion module may then determine the hierarchical structure of the document based on the table of content section of the document. In some embodiments where no table of content section is identified within the document, the data ingestion module may parse the text to determine section and/or subsection headings within the text. The data ingestion module may then generate the hierarchical structure based on the section and/or subsection headings.

The hierarchical structure may include multiple sections and/or subsections. After determining the hierarchical structure, the data ingestion module may map different portions of the text within the document to different sections and/or subsections of the hierarchical structure. In some embodiments, the data ingestion module may identify one or more sections within the document as legal obligation candidates based on parsing the portions of text that are mapped to the different sections and/or subsections. Other sections that are determined to not include legal obligations, such as background sections, indexes, and bibliographies, may not be considered or further processed to save on computing resources. In some embodiments, the data ingestion module may generate a legal obligation object for each legal obligation candidates extracted from the document. A legal obligation object may include a data structure for storing data associated with the legal obligation, which may include the portion of the text corresponding to the legal obligation candidate, a citation of the legal obligation (e.g., the section and/or subsection within the text), a reference to the document (e.g., a title, an issue date, etc.), a source or origin of the regulation (e.g., a government agency, a jurisdiction, etc.), or other metadata associated with the legal obligation candidate.

After extracting the legal obligation candidates from the document, the data ingestion module may use a machine learning model to determine whether each of the legal obligation candidates is relevant to the online service provider. In some embodiments, the legal obligation object corresponding to each legal obligation candidate may be passed to the machine learning model as an input. A supervised learning technique may be employed in training the machine learning model. In some embodiments, the machine learning model may be configured and trained to provide a relevancy value (e.g., a value within a range such as 0-100) that indicates a relevancy of the legal obligation candidate to the online service provide based on the data associated with the legal obligation candidate. The data ingestion module may then determine that a legal obligation candidate is relevant to the online service provider when the relevancy value exceeds a threshold (e.g., 75).

In some embodiments, the data ingestion module may also include a topic model configured to derive one or more topics for each portion of the text corresponding to a section and/or a subsection, based on the portion of the text. The topic model may analyze the words within the portion of the text and relationships among the words based on the positions of the words within the portion of the text to derive the one or more topics. The one or more topics may also be provided to the machine learning model as additional input values. In some embodiments, the data ingestion module may also use one or more knowledge graphs to understand the relationship between the online service provider and the portion of the text.

The data ingestion module may pass one or more input legal obligations that have been determined to be relevant to the online service provider to a recommender module of the computer platform. In some embodiments, the recommender module is configured to identify one or more software processes that are likely impacted by the one or more input legal obligations and determining software controls that can be implemented within the one or more software processes for mitigating risks associated with the input legal obligations. The recommender module may perform one or more analyses on each one of the one or more legal obligations. For example, the recommender module may compare each one of the input obligations against stored obligations associated with the online service provider. As discussed herein, the online service provider may have managed various obligations in the past. Specifically, the online service provider may have identified software processes that have been impacted by past legal obligations and may have implemented various software controls in the software processes to mitigate the risks associated with the past legal obligations. In some embodiments, information associated with the software processes that have been identified to be impacted by each of the past legal obligations and software controls implemented for each of the past legal obligations may be stored in a data storage.

Thus, in some embodiments, the recommender module may use information related to the past legal obligations, such as the software processes that have been determined to be impacted by the past legal obligations and software controls that have been implemented for the past legal obligations, to provide a prediction for the input obligation. For example, the recommender module may perform a multi-attribute analysis between the input obligation and each of the past legal obligations. Each of the legal obligations (e.g., the input obligation, each of the past legal obligations, etc.) may include multiple attributes that describe the legal obligation. For example, a legal obligation may include attributes such as an area of law, a sub-area of law, a source or origin of the regulation that includes the legal obligation, a risk category, and/or a risk type. In some embodiments, the recommender module may use a nearest neighbor algorithm to determine past legal obligations that are similar to the input obligation. For example, the recommender module may create a multi-dimensional space, where each dimension in the multi-dimensional space corresponds to a distinct legal obligation attribute. The recommender module may then determine, for the input legal obligation and each of the past legal obligations, a position within the multi-dimensional space based on the attributes associated with the legal obligation. The recommender module may then determine past legal obligations that are similar to the input legal obligation based on the distances between the input legal obligation and each of the past legal obligations.

In some embodiments, the recommender module may also perform a text-based analysis on the portion of the text associated with the input legal obligation. The portion of the text associated with the input legal obligation is extracted directly from the document. When performing the text-based analysis, the recommender module may analyze the words in the text to derive text-based attributes, such as a frequency of each word within the portion of the text, for the legal obligation. The text-based attributes may include different values (e.g., weights) associated with different words that appear in the portion of text. In some embodiments, the recommender module may also take into account the frequency of those words in the texts associated with the past legal obligations (e.g., a corpus) when determining the text-based attributes of the input obligation. In a non-limiting example, the recommender module may use a term frequency-inverse document frequency (tf-idf) approach in generating the text-based attributes for the input obligation. The recommender module may then determine past obligations that are similar to the input legal obligation based on the text-based attributes. In some embodiments, the text-based attributes may be used in addition to the other attributes in the multi-dimensional space for determining the past legal obligations that are similar to the input obligations.

In some embodiments, the recommender module may use an ensemble machine learning model that includes two or more different machine learning models to determine a subset of past legal obligations that are most similar to the input obligation. For example, the ensemble machine learning model may include an attribute-based machine learning model that is configured and trained to determine an attribute similarity score for each of the past legal obligations based on how similar the attributes associated with the past legal obligation to the attributes associated with the input obligation. The ensemble machine learning model may also include a text-based machine learning model that is configured and trained to determine a text similarity score for each of the past legal obligations based on the similarity between the text of the past legal obligation and the text of the input obligation. The recommender module may then determine a group (or a subset) of similar past legal obligations based on the attribute similarity scores and the text similarity scores.

Once the recommender module determines the subset of past legal obligations that are similar to the input obligation, the recommender module may determine the software controls that have been implemented within software processes for the subset of past legal obligations, and present the software controls on a graphical user interface to a user of the computer platform. In some embodiments, the visualization module is configured to present, in a graphical user interface, the recommended software controls that are necessary to implement within one or more software processes in order to reduce the risk associated with the input obligation. One of the problems with the conventional way of presenting recommendation outputs, especially for recommendation outputs that are determined based on a machine learning model, is that the recommendation is presented without any context. By simply presenting the recommendation without context, a user viewing the recommendation has no way of knowing how the outputs are generated, and may only resort to blindly accepting or rejecting the recommendation.

As such, according to some embodiments of the disclosure, the visualization module is configured to present an explainable visual interface that illustrates the recommended software controls for reducing the risk associated with the input obligation and how the predicted software controls are determined, such that the user viewing the recommendation can intelligently select which of the predicted software controls to implement within the software processes of the online service provider. In some embodiments, the visualization module may present the recommendation in a three-tier layout to illustrate the determination paths from the input obligation to the output recommended software controls. For example, the visualization module may present a graphical element representing the input obligation in the first tier. The visualization module may present obligation graphical elements representing the subset of past legal obligations that are similar to the input obligation in the second tier. The visualization module may present control graphical elements representing the software controls recommended to the user in the third tier.

In some embodiments, the visualization module may present the relationships between the input obligation and each of the similar past legal obligations, and the relationships between the past legal obligations and the recommended software controls in the graphical user interface. The relationships may be presented using lines or connections between the graphical elements. In some embodiments, the presentation may indicate the strength of each relationship, for example, using a thickness of the lines, etc. For example, the strength of a connection that connects the input obligation to a past legal obligation may be proportional to how similar the past legal obligation is to the input obligation, based on the similarity values determined from the ensemble machine learning model. In another example, the strength of a connection that connects a past legal obligation and a software control may be proportional to the number of software processes in which the software control has been implemented for the past legal obligation.

Furthermore, the graphical elements presented on the graphical user interface may be interactive, where each of the graphical elements may be selectable by a user. In some embodiments, the selection of a graphical element is an event that may trigger a modification to the graphical user interface. For example, upon detecting a selection of an obligation graphical element representing a past legal obligation, the visualization module may modify the graphical user interface by highlighting control graphical elements corresponding to software control(s) that have been implemented for the past legal obligation (e.g., changing a color of the control graphical elements, increasing the size of the control graphical elements, etc.). The visualization module may also present, on the graphical user interface, information that illustrates how the past legal obligation is determined to be associated with the input legal obligation. For example, the visualization module may present the shared attributes between the input legal obligation and the past legal obligation and/or the similarity scores determined by ensemble machine learning model.

In another example, upon detecting a selection of a control graphical element representing a software control that has been implemented in one or more software processes of the online service provider, the visualization module may modify the graphical user interface by highlighting one or more obligation graphical elements corresponding to one or more past legal obligations for which the software control has been implemented (e.g., changing a color of the obligation graphical elements, increasing the size of the obligation graphical elements, varying the markers of the obligation graphical elements, etc.).

In some embodiments, the selection of one or more control graphical elements may also trigger a risk reduction estimation event. For example, upon receiving a selection of one or more control graphical elements, the visualization module may pass data associated with the software controls corresponding to the selected control graphical elements to the recommender module for determining a risk reduction score. The risk reduction score represents an extent in which the risk associated with the input legal obligation is reduced based on implementations of the selected software controls. The recommender module may determine the risk reduction score using different techniques. In some embodiments, the recommender module may determine a risk reduction score for each of the selected software controls. The risk reduction score for a software control may be determined based on one or more factors, such as a number of software processes in which the software control has been implemented, a number of past legal obligations for which the software control has been implemented, an execution frequency (e.g., how often is the software control executed within the software processes), whether the software control provides automatic processing of data and/or transaction or requires manual intervention, etc.

After determining the individual risk reduction score for each of the software controls, the recommender module may rank the software controls based on the risk reduction scores. In some embodiments, the recommender module may determine a weight for each of the software control based on a ranking of the software control. The weight may be determined in proportion to the ranking (e.g., more weight is given to software controls having higher rankings). For example, a 100% weight may be given to the software control that is ranked first. A reduced weight (e.g., 80%) may be given to the software control that is ranked second. The recommender module may also determine a cutoff ranking (e.g., fifth, sixth, etc.) where 0% of weight is given to software controls that rank below the cutoff ranking. In some embodiments, the recommender module may determine the risk reduction score for the selected software controls based on the weighted individual risk reduction scores. The recommender module may pass the risk reduction score to the visualization module for presenting on the graphical user interface.

After presenting the risk reduction score on the graphical user interface, the user may modify the selection (e.g., adding and/or removing one or more control graphical elements). Upon detecting a modification of the selection, the visualization module may request the recommender module to re-calculate the risk reduction score and present the updated risk reduction score on the graphical user interface. Thus, by using the graphical user interface provided by the visualization module to select different subsets of control graphical elements on the graphical user interface and compare the risk reduction scores corresponding to the different subsets of control graphical elements, the user may acquire an understanding of how each software control affects the reduction of risk associated with the input obligation. Based on this information, the user may intelligently decide which software control(s) to implement for the input legal obligation. The user may accept in full, partially accept, or reject the recommendations by selecting which software control(s) to implement. In some embodiments, the graphical user interface provided by the visualization module may also enable the user to select which of the software controls to be implemented.

In some embodiments, upon receiving a selection of software controls to implement within one or more software processes of the online service provider, the computer platform may automatically generate software programming code for the selected software controls. The computer platform may also automatically incorporate the programming code into the programming code associated with the one or more software processes such that the software controls are implemented within the software processes to mitigate the risk associated with the input obligation. In some embodiments, the selection of the software controls may be used as feedback to re-train the machine learning models in predicting similar legal obligations and recommending software controls for future input legal obligations.

FIG. 1 illustrates a networked system 100, within which the computer platform may be implemented according to one embodiment of the disclosure. Note that the present techniques may be applied in many different computing and technological environments, however, and are not limited to those shown in the figures. The networked system 100 includes a service provider server 130, a merchant server 120, a user device 110, and agency servers 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online transaction with the merchant server 120 via websites hosted by, or mobile applications associated with, the merchant server 120. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130, and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account (e.g., and a particular profile) maintained by the service provider server 130.

In various implementations, the user 140 is able to input data and information into an input component (e.g., a keyboard) of the user device 110. For example, the user 140 may use the input component to interact with the UI application 112 (e.g., to retrieve content from third-party servers such as the merchant server 120, to provide inputs related to a goal to the service provider server 130, etc.).

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for viewing, accessing, and/or purchasing, and process payments for the purchases. As shown, the merchant server 120 may include a merchant database 124 for identifying available items, which may be made available to the user devices 110, 180, and 190 for viewing and purchase by the user.

The merchant server 120, in one embodiment, may include a marketplace application or server 122, which may be configured to provide information (e.g., displayable content) over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for access and/or purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

Each of the agency servers 180 and 190 may be associated with a different government agency, such as an agency that regulates financial transaction (e.g., Securities and Exchange Commission), an agency that regulates privacy issues (e.g., Electronic Privacy Information Center). Furthermore, the government agencies corresponding to the agency servers 180 and 190 may be associated with different jurisdictions (e.g., the United States, Europe, Brazil, Japan, etc.). The agency servers 180 and 190 may store and provide the public access to different regulations promulgated by the corresponding agencies. For example, each of the agency servers 180 and 190 may include a web server that provides a web interface for the public to access information stored on the agency servers 180 and 190. Through the web interface, the user 140 may use the user device 110, or the service provider server 130, may access data stored on the agency servers 180 and 190, which may include documents associated with regulations that have been promulgated by the corresponding agencies.

The service provider server 130, in one embodiment, may be maintained by a transaction processing entity or an online service provider, which may provide processing for electronic transactions between the users of the user device 110, and one or more merchants or other types of payees. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130. In some embodiments, the fragment module integration framework may be implemented within or in association with the interface server 134.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a government regulation compliance (GRC) module 132 that implements computer platform as discussed herein. The GRC module 132 may monitor new regulations and/or changes to existing regulations from different agencies across different jurisdictions. For example, the GRC module 132 may access agency servers corresponding to the various agencies (e.g., the agency servers 180 and 190, etc.) to retrieve regulation information on a regular basis (e.g., periodically, etc.) or on demand. As discussed herein, some or all of the software processes executed by the service provider server 130 (e.g., the software processes associated with the service application 138, the software processes associated with processing and storing data in the account database 136, etc.) may be associated with areas that are affected by the regulations. For example, since the service provider server 130 illustrated herein is configured to facilitate electronic payment transactions between users (e.g., the user 140) and between users and merchants, the service provider server 130 may include or otherwise execute software processes for processing the electronic payment transactions for users, for processing, transmitting over a network, and/or storing sensitive information such as personal identifiable information (e.g., social security numbers, addresses, location information, passwords, etc.), financial information (e.g., credit card account numbers, etc.), or other types of information. As such government regulations related to the areas of law such as financial transaction laws, privacy laws, may impact how the online service provider of the service provider server 130 performs operations. Changes and/or additions to the operations may be necessary in order to comply with these regulations.

Thus, when the GRC module 132 detects that a new regulation or a change to an existing regulation (e.g., an amendment) has been promulgated by an agency, the GRC module 132 may initiate a process to extract legal obligations from the regulation, identify business and software processes that are impacted by the legal obligations (e.g., the software processes that are executed by the service application 138, etc.), and recommend implementation of software controls within the software process that are impacted by the legal obligations to mitigate the risks associated with the legal obligations. In some embodiments, the GRC module 132 may present the recommended software controls in an interactive graphical user interface (e.g., presented on a device 150) that illustrates how the software controls are determined based on the legal obligations. The interactive graphical user interface may also allow a user of the device 150 to select software controls to be implemented within the software processes. In some embodiments, the GRC module 132 may automatically implement the selected software controls within the software processes to mitigate the risks associated with the regulation for the service provider server.

Figure 2:
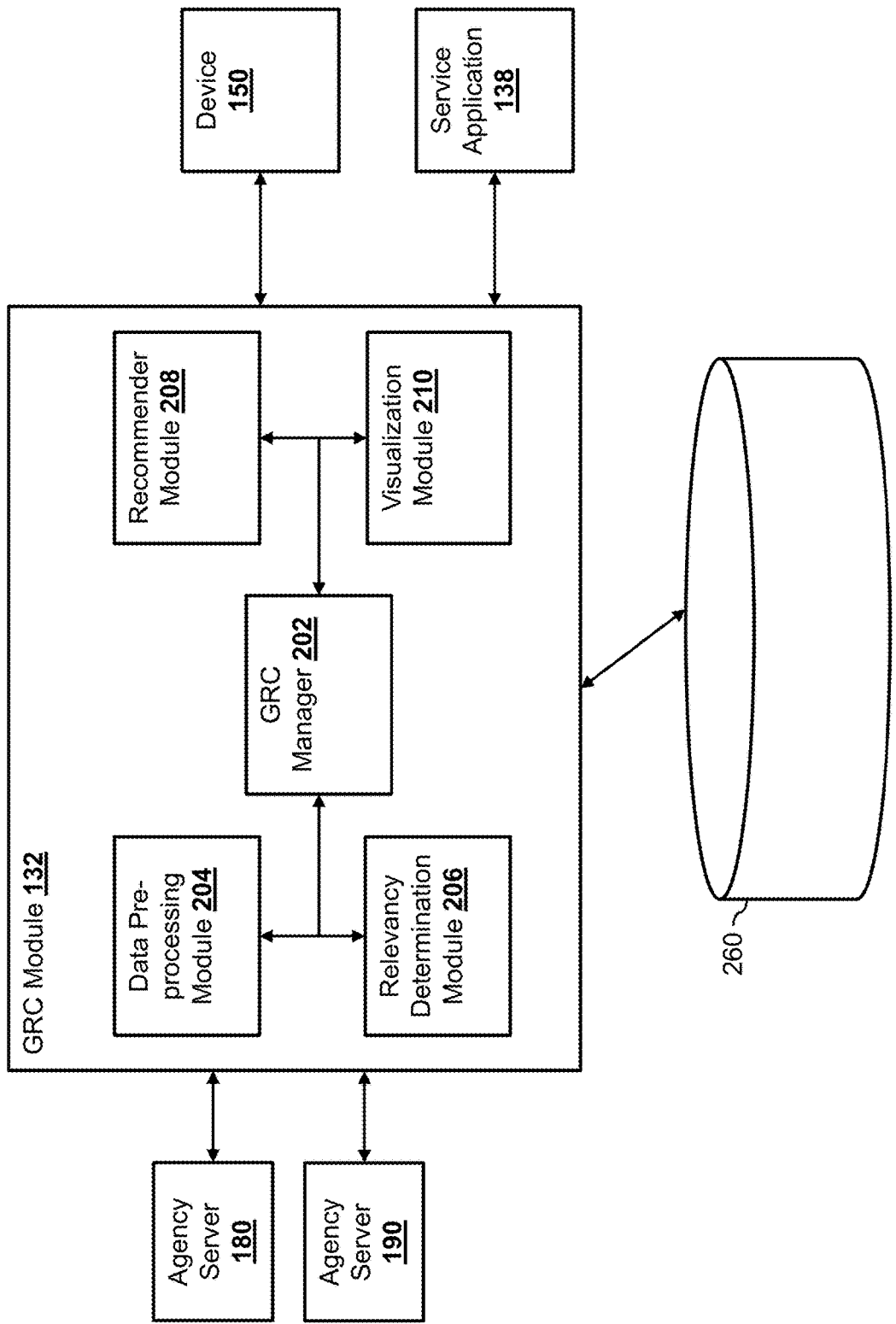
FIG. 2 is a block diagram illustrating a government regulation compliance (GRC) module according to an embodiment of the present disclosure.

FIG. 2 illustrates a block diagram of the GRC module 132 according to an embodiment of the disclosure. The GRC module 132 includes a GRC manager 202, a data pre-processing module 204, a relevancy determination module 206, a recommender module 208, and a visualization module 210. As shown, the GRC module 132 may be communicatively coupled with the agency servers 180 and 190, corresponding to different agencies that promulgate regulations, which may affect how the online service provider of the service provider server 130 performs its operations. In some embodiments, the GRC manager 202 may access the agency servers 180 and 190 regularly (e.g., periodically) to determine whether new regulations or changes to existing regulations have been promulgated by the corresponding agencies. For example, the GRC manager 202 may include a web crawler configured to access websites associated with the agency servers 180 and 190 periodically to determine any updates to the regulations (e.g., any new document related to a new regulation uploaded to the agency servers 180 and 190). In another embodiment, the GRC manager 202 may access the agency servers 180 and 190 when it receives an indication that a new regulation has been added or an existing regulation has been changed.

When a regulation is promulgated, the agency that promulgated the regulation would usually publish one or more documents that include text associated with the regulation. A regulation document may include multiple pages of text that explains different aspects of the regulation. For example, the document may include text that explains the background of the regulation, text that explains a history of the regulations, text that explains various requirements (or obligations) imposed by the regulations, etc. Thus, upon detecting that a new regulation (or a change to an existing regulation) from one of the agency servers 180 or 190, the GRC manager 202 of some embodiments may obtain a document associated with the new regulation from the agency server (e.g., downloading the document from the agency server).

The GRC manager 202 may then pass the document to the data pre-processing module 204. In some embodiments, the data pre-processing module 204 and the relevancy determination module 206 may collaboratively implement the functionalities of the data ingestion module as discussed above. Specifically, the data pre-processing module 204 may process the text within the document and extract legal obligations that are associated with the regulation. The relevancy determination module 206 may determine whether a legal obligation is relevant to the online service provider (e.g., requires the online service provider to modify one or more of its operations in order to comply with the regulation). When it is determined that a legal obligation is relevant to the online service provider, the GRC manager 202 may use the recommender module 208 to identify software processes that may be impacted by the legal obligation and predict software controls for implementing within the software processes. The visualization module 210 may then present the recommended software controls on a device (e.g., the device 150) in a manner that illustrates to a user of the device 150 how the software controls are determined for the obligation. Based on the illustrative presentation provided by the visualization module 210, the user may intelligently select one or more software controls from the recommended software controls to implement in the software processes of the service provider server 130 to mitigate the risk associated with the legal obligation. In some embodiments, the GRC module 132 may implement the software controls within the software processes, for example incorporating additional programming code within the software modules of the service application 138.

Figure 3:
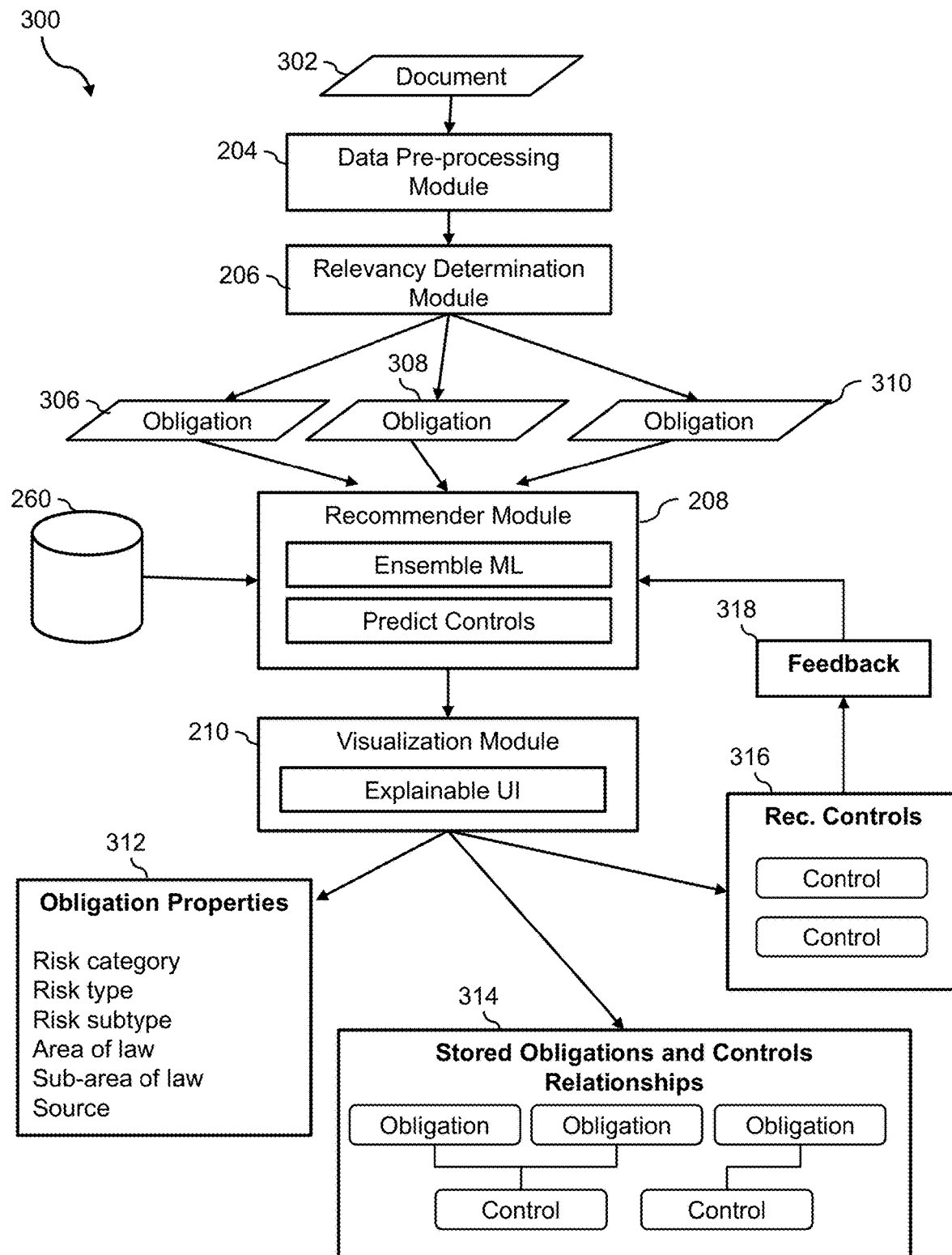
FIG. 3 illustrates a data flow for processing a regulation document according to an embodiment of the present disclosure.

FIG. 3 illustrates an overview 300 of the regulation compliance functionalities performed by the GRC module 132. As discussed herein, the GRC manager 202 may monitor agency servers 180 and 190 to determine whether a new regulation or a change to an existing regulation has been promulgated. If a new regulation or a change to an existing regulation is detected, the GRC manager 202 may retrieve a document (e.g., a document 302) from a corresponding agency server. After retrieving the document 302, the data pre-processing module 204 may perform one or more pre-processing operations on the text of the document 302. In some embodiments, the pre-processing performed by the data pre-processing module 204 may include identifying and removing irrelevant text (e.g., headers and footers, etc.) from the document. In some embodiments, the pre-processing may also include determining a hierarchical structure associated with the document and mapping different portions of text within the document to different sections and/or subsections of the hierarchical structure. Each portion of text that is mapped to a particular section and/or a particular subsection of the hierarchical structure may correspond to a legal obligation candidate.

In some embodiments, the relevancy determination module 206 may analyze each legal obligation candidate (e.g., using a machine learning model) to determine whether the legal obligation candidate is relevant to the online service provider. The relevancy determination module 206 may determine one or more legal obligations (e.g., legal obligations 306-310) that are relevant to the online service provider based on the document 302. The relevancy determination module 206 may then transmit information associated with the legal obligations 306-310 (as input legal obligations) to the recommender module 208. For each input legal obligation, the recommender module 208 may predict software controls that can be implemented in one or more software processes in order to mitigate the risks associated with the input legal obligation. As shown in FIG. 3, the recommender module 208 may include an ensemble machine learning model. The ensemble machine learning model may be trained to determine past legal obligations that are similar to the input legal obligations using data stored in the data storage 260. The data stored in the data storage 260 may include information associated with past legal obligations that impact the operations of the service provider server 130.

The ensemble machine learning model may include an attribute-based machine learning model configured to determine past legal obligations that are similar to the input legal obligations based on attributes of the input legal obligations. The ensemble machine learning model may also include a text-based machine learning model configured to determine past legal obligations that are similar to the input legal obligations based on the text corresponding to the input legal obligation.

After determining a group of past legal obligations that are similar to the input legal obligation using the ensemble machine learning model, the recommender module 208 may predict a set of software controls that can be implemented within the service provider server 130 to mitigate the risk associated with the input legal obligation. For example, the recommender module 208 may determine the software controls that have been implemented for the group of past legal obligations. The recommender module 208 may rank the software controls and determine a subset of software controls having rankings above a predetermined threshold.

The visualization module 210 may be configured to generate a graphical user interface for presenting the software controls 316 recommended for the input obligation. In some embodiments, the visualization module 210 may be configured to present the recommendations in a manner that illustrates how the software controls are determined. For example, the graphical user interface may illustrate the past legal obligations that are determined to be similar to the input legal obligation, and the attributes of the past legal obligations 312 (e.g., an area of law, a risk type, a source of the regulation, etc.) that are similar to the input legal obligation. It is noted that these are example obligation properties used according to some embodiments of the disclosure, but some other properties associated with obligations may exist, be added and/or removed. In some embodiments, the graphical user interface may also illustrate the relationships 314 between the past legal obligations and the software controls that are recommended for the input obligation.

In some embodiments, the graphical user interface provided by the visualization module 210 may enable the user to select one or more software controls from the recommended software controls to implement within the service provider server 130. The selection of the software controls may be used as feedback 318 for improving and/or re-training the recommender module 208 for subsequent recommendations.

As discussed herein, the data pre-processing module 204 is configured to process the text within the document 302 associated with a regulation such that legal obligations may be extracted from the text. In some embodiments, the data pre-processing module 204 may identify and remove irrelevant text from the document 302. For example, the data pre-processing module 204 may identify and remove headers and footers from the document 302. Headers and footers are often not part of the document 302 itself, but are placed (usually on the top margin and the bottom margin of each page of the document) to provide additional information to a reader, such as a page number, a name of the document, a name of the current section within the document, etc. As such the headers and footers of the text are not part of the regulation itself.

In some embodiments, the data pre-processing module 204 may identify headers and footers of the document 302 using a sliding window technique. Using the sliding window technique, the data pre-processing module 204 may traverse the document 302 one page at a time. At each particular page of the document 302, the data pre-processing module 204 may access text from neighboring pages (e.g., pages that precedes and succeeds the page, etc.). In some embodiments, the data pre-processing module may access text from adjacent pages (e.g., 3 pages, 5, pages, 7 pages, etc.) immediately preceding and/or succeeding the particular page.

FIG. 4A illustrates the use of a sliding window technique in identifying headers and footers according to one embodiment of the disclosure. As shown, the document 302 may include a sequence of pages 402, including pages 412-430. The data pre-processing module 204 may traverse the document 302 page by page. In some embodiments, the data pre-processing module 204 may process the pages 402 of the document 302 in order (e.g., from the first page to the last).

The data pre-processing module 204 may generate a sliding window 440 that includes the current page that is being processed by the data pre-processing module 204. The sliding window 440 may have a predetermined size (e.g., 3 pages, 7 pages, 15 pages, etc.). In this example, the data pre-processing module 204 may determine that the sliding window 440 has a size that encompasses six pages.

When the data pre-processing module 204 processes a current page of the document 302, the data pre-processing module 204 may move the sliding window 440 to a position of the document 302 based on the current page. For example, when the data pre-processing module 204 processes the page 420, the data pre-processing module 204 may move the sliding window 440 to be centered at the current page 420, such that the sliding window 440 encompasses two pages that precede the current page 420 (including pages 416 and 418) and two pages that succeed the current page 420 (including pages 422 and 424).

In some embodiments, when the current page does not have two preceding pages or two succeeding pages, the data pre-processing module 204 may move the sliding window 440 over to include additional succeeding page(s) or to include additional preceding page(s). For example, when the data pre-processing module 204 is processing the first page of the document 302, since the first page of the document does not have any preceding pages, the data pre-processing module 204 may move the sliding window 440 forward to include additional succeeding pages, such that the sliding window 440 may include page one (the current page) and four succeeding pages after page one. Similarly, when the data pre-processing module 204 is processing the last page of the document 302, since the last page of the document does not have any succeeding pages, the data pre-processing module 204 may move the sliding window 440 backward to include additional preceding pages, such that the sliding window 440 may include the last page (the current page) and four preceding pages before the last page.

After positioning the sliding window 440 based on the current page (e.g., the page 420), the data pre-processing module 204 may analyze the top and/or bottom lines (e.g., the top 3 lines, the top 5 lines, etc.) of text from the pages within the sliding window 440 (e.g., the pages 416-423). In some embodiments, the data pre-processing module 204 may compare the text in the top and/or bottom lines of the current page 220 against the text in the top and/or bottom lines of each of the other pages 416, 418, 422, and 424, within the sliding window 440. For example, the data pre-processing module 204 may compare the first line of text from the current page 420 against the first line of text from other pages 416, 418, 422, and 424 within the sliding window 440. The data pre-processing module 204 may then compare the second line of text from the current page 220 against the second line of text from each of the other pages 416, 418, 422, and 424 within the sliding window 440, and so forth. The data pre-processing module 204 may determine that a line of text in the current page 420 likely corresponds to a header or a footer based on the comparison.

For example, the data pre-processing module 240 may determine that a line of text (e.g., the first line) in the current page 420 likely corresponds to a header or a footer when the comparisons between the line of text in the current page 420 and the lines of text in the other pages (e.g., the pages 416, 418, 422, and 424) exceeds a predetermined similarity threshold. The determination of similarity may be based on the actual text in the lines of text, the number of characters in the line of text of the respective pages, an alpha-numeric arrangement pattern, a pattern derived from the lines of text corresponding to the pages (e.g., the pages 416-424), and other factors. For example, when the line of text includes a title of the document 302, the lines of text across the pages within the sliding window should be identical. Thus, the data pre-processing module 204 may determine that the line of text in the current page 420 corresponds to a header or a footer of the page 420.

In another example, when the line of text includes a page number of the page within the document 302, the data pre-processing module 204 may determine that the length of text in the lines of text across the different pages within the sliding window 440 is identical, and that the text across the different pages have the same alpha-numerical arrangement (e.g., one numeral). Furthermore, the data pre-processing module 204 may derive a pattern based on the lines of text across the different pages within the sliding window 440 (the number increases by a predetermined value in each consecutive page). Thus, based on these factors, the data pre-processing module 204 may determine that the line of text in the current page 420 corresponds to a header or a footer.

In yet another example, the line of text may include a section title of the section to which the text of the page belongs. Since the section may span across multiple pages, the line of text across several consecutive pages may be identical. In this example, the data pre-processing module 204 may determine that the line of text from the current page 420 is identical to the line of text in some of the pages within the sliding window 440 (e.g., pages 418 and 422) but different from the line of text from other pages within the sliding window 440 (e.g., pages 416 and 424). The data pre-processing module 204 may still determine that the similarity between the line of text from the current page 420 and the line of text from other pages in the sliding window 440 is sufficiently high. Thus, the data pre-processing module 204 may determine the line of text in the current page 420 as a header or a footer.

Figure 4B:
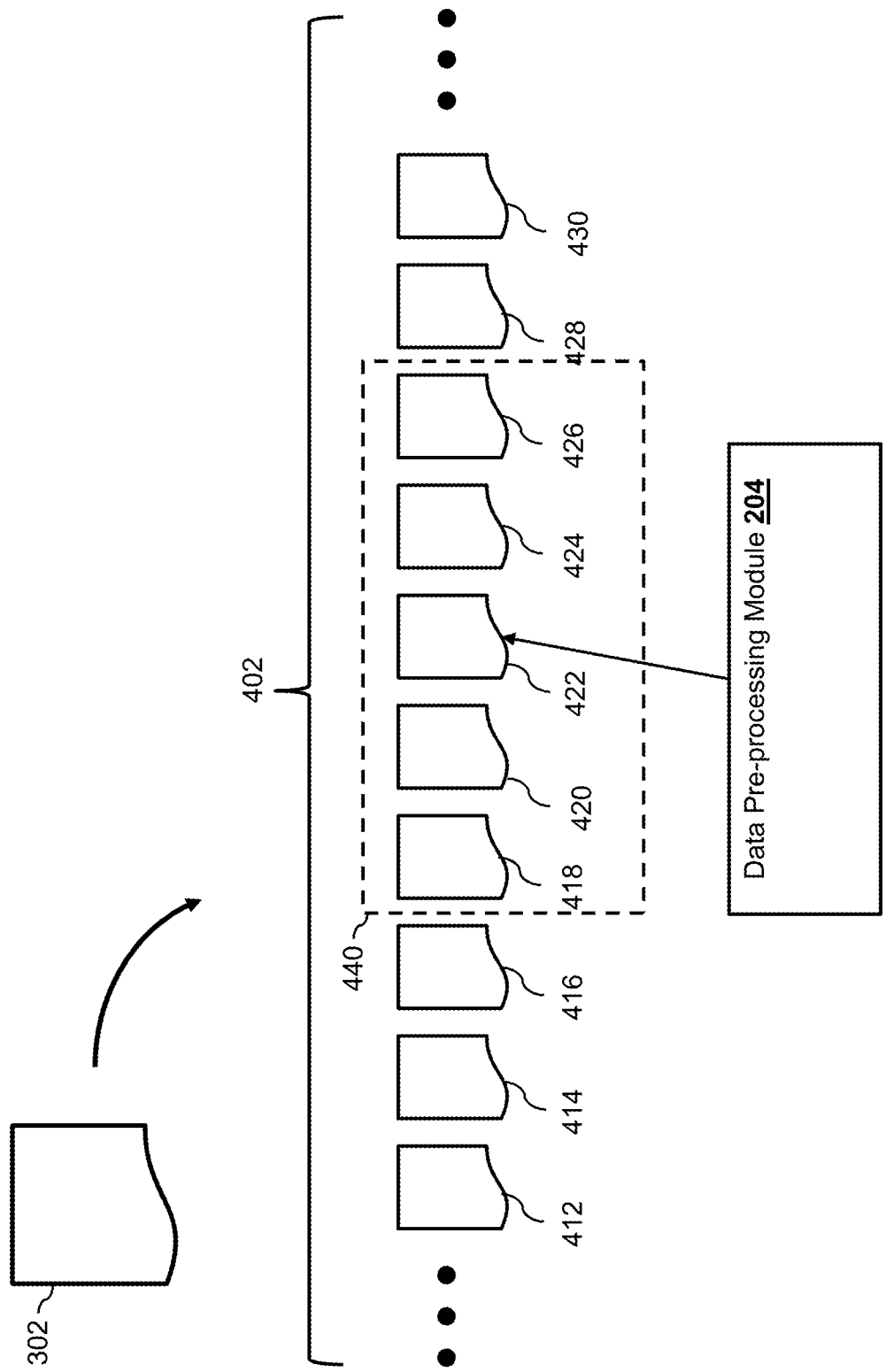

After identifying the irrelevant text within the current page 420, the data pre-processing module 204 may tag the irrelevant text (e.g., the line(s) of text determined to be irrelevant using the sliding window technique) in the current page 420 (to be removed after all of the pages in the document 302 have been analyzed), and continue to traverse the pages in the document 302 that have not been processed. FIG. 4B illustrates the progression of processing pages using the sliding window technique. As shown in FIG. 4B, after processing the page 420, the data pre-processing module 204 continues to process another page (e.g., the next page 422) within the document 302. The data pre-processing module 204 also moves the sliding window 440 to encompass a different set of pages that centers on the current page 422. In this example, the data pre-processing module 204 has moved the sliding window 440 to encompass the pages 418-428, such that two pages from the left side of the current page 422 and the two pages from the right side of the current page 422 are included in the sliding window 440. The data pre-processing module 204 may perform the same analyses on the top and bottom lines of text from the pages within the sliding window 440 to determine whether any line of text in the current page 422 include irrelevant text. The data pre-processing module 204 may tag the irrelevant text from the current page 422 and continue to traverse other pages in the document 302. After processing all of the pages in the document 302, the data pre-processing module 204 may remove all the tagged text in the pages.

Figure 4C:
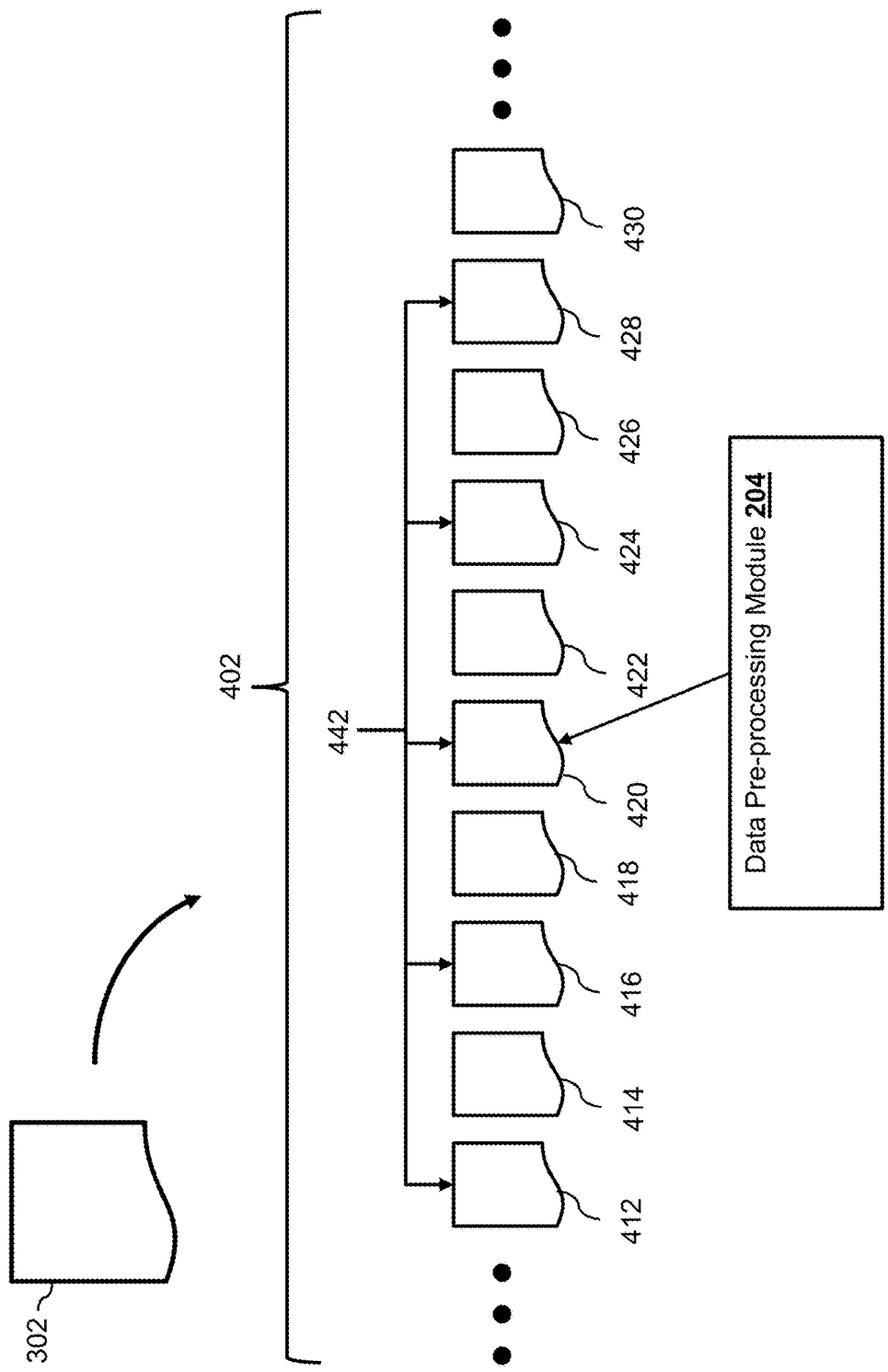

In some embodiments, instead of or in addition to accessing text from adjacent pages, the data pre-processing module 204 may place the sliding window 440 around a current page being processed to encompass alternate pages (e.g., every other page, every two pages, etc.) preceding and/or succeeding the current page. FIG. 4C illustrates processing the document 302 using a sliding window technique under this approach. As shown in FIG. 4C, the data pre-processing module 204 is processing the page 420 from the document 302. In this example, instead of placing the sliding window 442 over consecutive pages preceding and succeeding the current page 420, the data pre-processing module 204 may place the sliding window 442 over alternate pages preceding and succeeding the current page 420. Thus, the sliding window 442 encompasses pages 412, 416, 420, 424, and 428.

Figure 4D:
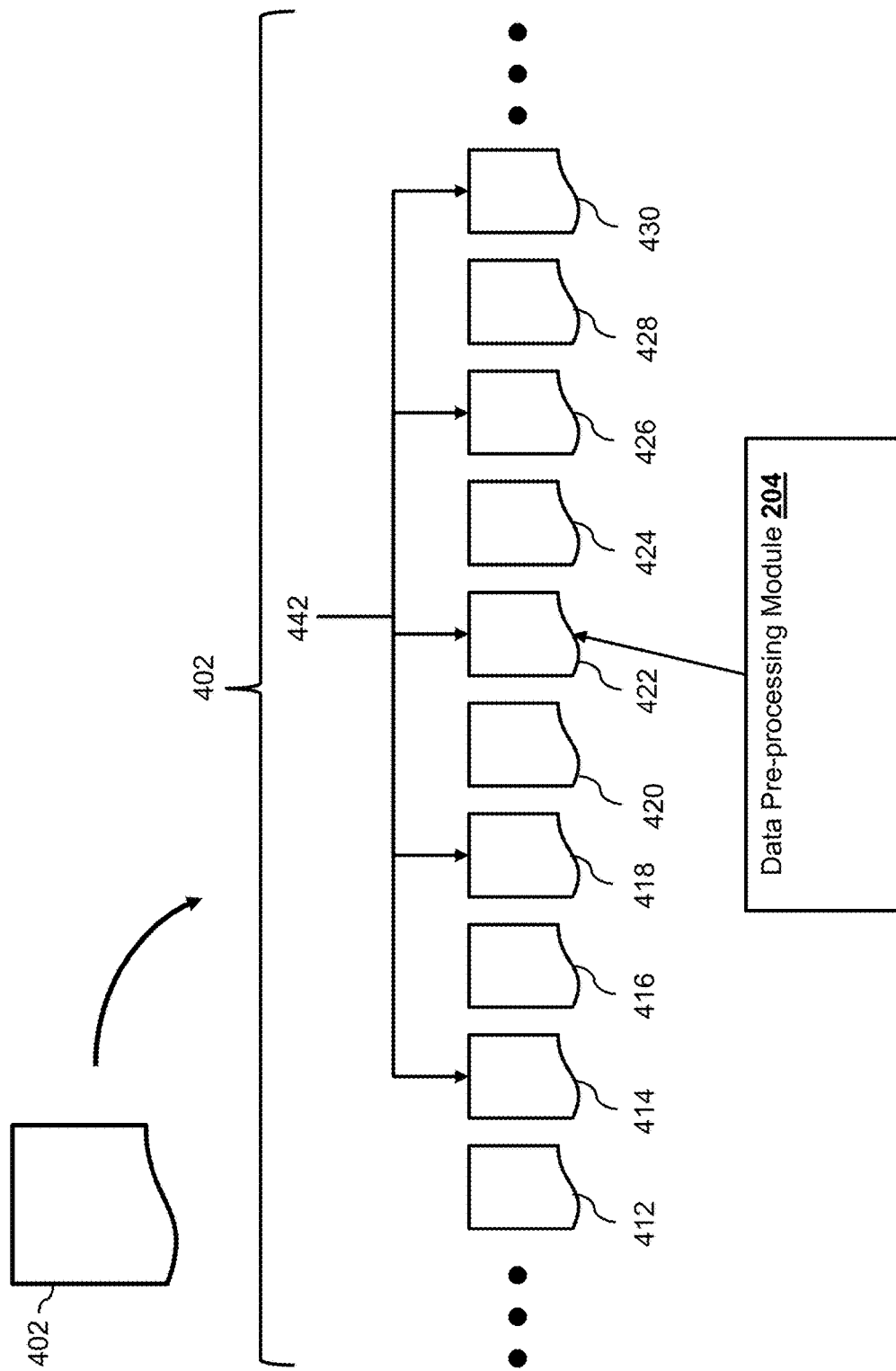

The data pre-processing module 204 may then analyze the top and bottom lines of text from the pages 412, 416, 420, 424, and 428 within the sliding window 442 in a similar manner as discussed above to identify irrelevant text within the current page 420. The data pre-processing module 204 may also remove the irrelevant text from the current page 420, and continue to process other pages within the document 302. FIG. 4D illustrates the progression of processing pages of the document 302 under this approach. As shown in FIG. 4D, after finishing processing the page 420, the data pre-processing module 204 begins to process the next page 422. The data pre-processing module 204 also moves the sliding window 442 based on the current page 422, such that the sliding window 442 covers alternate pages preceding and succeeding the current page 422 (which includes the pages 414, 418, 422, 426, and 430). The data pre-processing module 204 may perform the analysis on the top and bottom lines of text from the pages 414, 418, 422, 426, and 430 in the sliding window 442, and identify irrelevant text within the current page 422 using the same technique as described herein. The data pre-processing module 204 may then tag the irrelevant text from the page 422 and continue traversing other pages in the document 302.

In some embodiments, the data pre-processing module 204 may perform multiple passes of analyzing the text within the pages, where the data pre-processing module 204 may use a different sliding window in each pass. For example, in the first pass of analyzing the text within the pages, the data pre-processing module 204 may configure a sliding window (e.g., the sliding window 440) to encompass consecutive pages preceding and succeeding the current page. After the first pass, the data pre-processing module 204 may perform a second pass of analyzing the pages within the document 302 using a sliding window (e.g., the sliding window 442) configured to encompass alternate pages (e.g., every other page) preceding and succeeding the current page. In some embodiments, the data pre-processing module 204 may perform the second pass of analyzing the pages only if the first pass did not yield any result (e.g., did not identify and tag any irrelevant text within the pages).

The data pre-processing module may continue to process the pages again in a third pass, a fourth pass, a fifth pass, etc., where a different sliding window is used in a different pass. For example, in the third pass, a sliding window that encompasses every two pages preceding and succeeding the current page is used. In a fourth pass, a sliding window that encompasses every three pages preceding and succeeding the current page is used. In a fifth pass, a sliding window that encompasses every four pages preceding and succeeding the current page is used. Analyzing the pages in multiple passes ensures that irrelevant text is properly identified and removed from the pages, as certain headers and/or footers may not appear in every page, but only in every other page, every two pages, etc.

In some embodiments, the data pre-processing module 204 may also determine a hierarchical structure of the document 302 based on analyzing the text of the document 302. The hierarchical structure of a document associated with a regulation may include multiple sections and subsections. In some embodiments, the data pre-processing module 204 may identify a table of content section within the document 302. Many regulation documents include a table of content (TOC) section because of the large volume of the documents. The TOC section includes text that specifies the hierarchical structure (e.g., different sections and subsections, section identifiers, section titles, etc.). Thus, in some embodiments, the data pre-processing module 204 may determine the hierarchical structure of the document 302 based on the TOC section. The TOC sections of different documents often share common characteristics. For example, the TOC section may have a title that includes words such as "table" and/or "content." Furthermore, the TOC section may include multiple lines of text that begins and/or ends with a number (Arabic numerals, Roman numerals, etc.) that denote a section identifier and/or a page identifier. The data pre-processing module 204 may derive a base pattern for a typical TOC section.

In some embodiments, the data pre-processing module 204 may traverse the text in the document 302 to derive patterns from different portions of the text. The data pre-processing module 204 may determine that a particular portion of the text corresponds to a table of content section of the document 302 when a pattern derived from the particular portion of the text matches the base pattern corresponds to a typical TOC section. The data pre-processing module 204 may then extract a hierarchical structure from the text within the TOC section. For example, the data pre-processing module 204 may determine different sections and subsections based on different lines of text within the TOC section.

In the event that no TOC section is identified within the document 302, the data pre-processing module may parse the text within the document 302 to identify identifiers associated with sections and subsections (e.g., section titles, etc.). Each section and/or subsection within the text usually begins with a section/subsection identifier (e.g., section numbers, section titles, etc.). Thus, the data pre-processing module 204 may use similar pattern recognition techniques to identify the section/subsection identifiers within the text of the document 302. Once the section/subsection identifiers are determined, the data pre-processing module 204 may generate a hierarchical structure based on the section/subsection identifiers.

After determining the hierarchical structure, the data pre-processing module 204 may map different portions of the text within the document 302 to different sections and/or subsections within the hierarchical structure. For example, the data pre-processing module 204 may parse through the text of the document 302. When the data pre-processing module 204 identifies a section or subsection identifier within the text outside of the TOC section (e.g., a section or subsection title), the data pre-processing module 204 may extract a portion of the text that follows the section or subsection identifier (but before the next section or subsection identifier). The data pre-processing module 204 may map the portion of the text to the corresponding section or subsection based on the section or subsection title. Since each section or subsection from the document 302 may correspond to a different legal requirement associated with the regulation, the data pre-processing module 204 may designate each portion of the text as a legal obligation candidate. In some embodiments, the data pre-processing module 204 may generate, for each legal obligation candidate, a data structure for storing information associated with the corresponding legal obligation, such as the portion of the text and related information.

Figure 5:
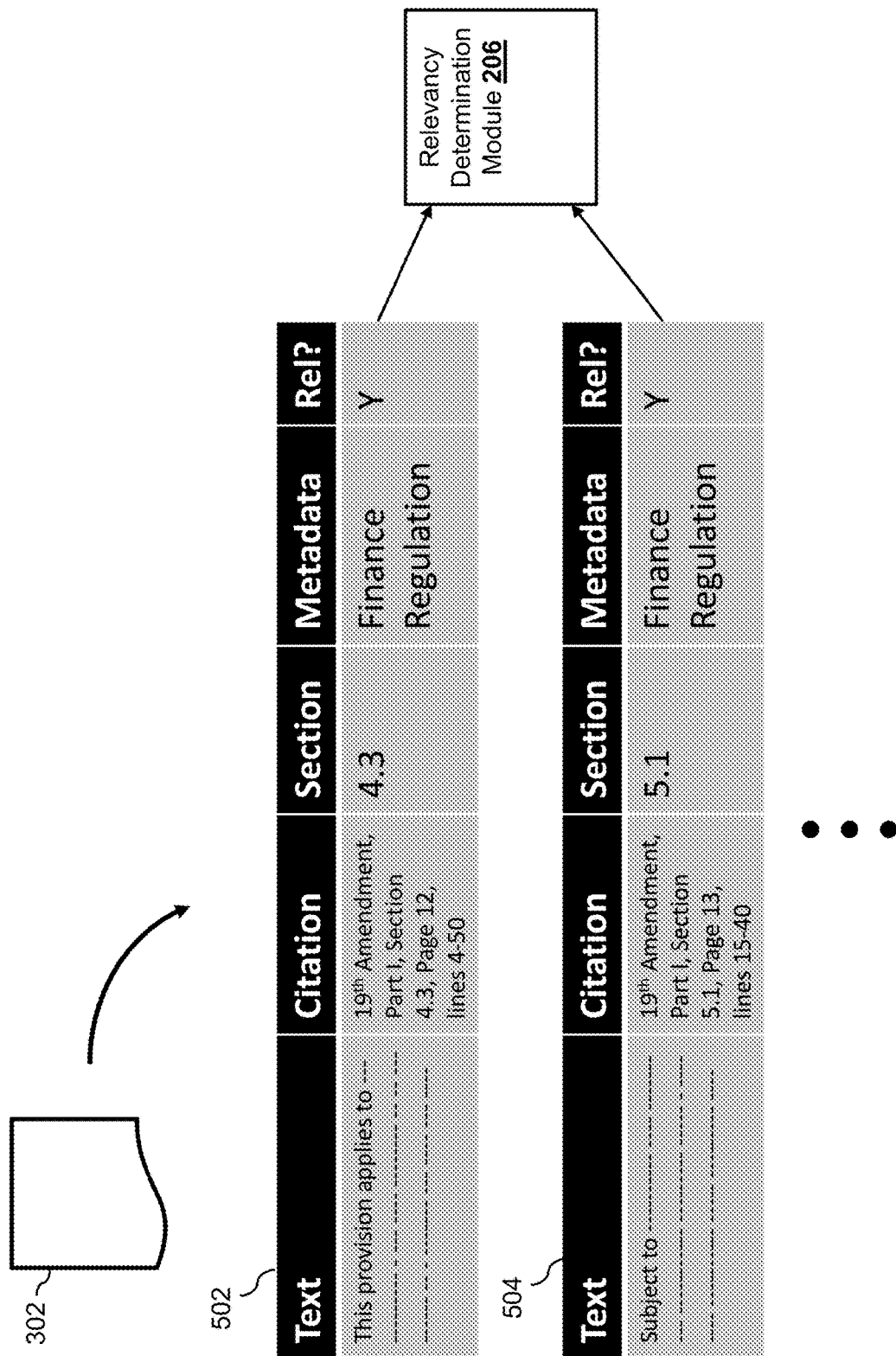
FIG. 5 illustrates an example data structure for storing data associated with legal obligation candidates extracted from a regulation document according to an embodiment of the present disclosure.

FIG. 5 illustrates an example data structure that is generated for a legal obligation candidate according to an embodiment of the disclosure. Specifically, FIG. 5 shows data structures 502 and 504 for storing data associated with legal obligations extracted from the document 302. As shown, each of the data structures 502 and 504 includes a text portion for storing the portion of the text corresponding to the legal obligation from the document 302, a citation portion for storing a citation for the legal obligation (which may include a title of the document 302, a section identifier, a page identifier, etc.), a section portion for storing the section and or section that includes the portion of the text corresponding to the legal obligation, and a metadata portion that stores other information associated with the legal obligation, such as an area of law associated with the regulation, a risk type associated with the regulation, an origin of the regulation (e.g., which government agency promulgated the regulation), a jurisdiction associated with the regulation, etc. In some embodiments, each of the data structures 502 and 504 may also include a relevancy portion storing a relevancy flag indicating whether the legal obligation is relevant to the online service provider. The relevancy flag may be turned off by default. The data pre-processing module 204 may generate different data structures (e.g., the data structures 502 and 504) for storing data associated with different legal obligation candidates extracted from the document 302.

The data pre-processing module 204 may then pass the legal obligation structures (e.g., the data structures 502 and 504) to the relevancy determination module 206 for determining whether each of the legal obligation candidates is relevant. In some embodiments, the relevancy determination module 206 may use a machine learning model to determine a relevancy of a legal obligation. The machine learning model may be trained using information associated with past legal obligations. For example, attributes of the legal obligations (e.g., corresponding text, area of law, risk type, source of the regulation, etc.) may be used as input values for the machine learning model. In some embodiments, the data structure generated by the data pre-processing module 204 may be used as input for the machine learning model. Past legal obligations, which may be in the form of the data structures, may be used to train the machine learning model. The relevancy label within the data structures may be used to modify the transformation in the machine learning model to optimize the prediction performance of the machine learning model. The machine learning model may be configured to output a value indicating a level of relevancy of a particular obligation to the online service provider. The relevancy determination module 206 may then determine whether a legal obligation is relevant to the online service provider based on whether the output value is above or below a predetermined threshold.

As discussed herein, the data pre-processing module 204 may extract multiple legal obligation candidates from a single regulation document 302. From the multiple legal obligation candidates, the relevancy determination module 206 may determine one or more legal obligations that are relevant to the online service provider. The one or more legal obligations that are relevant to the online service provider may impact how the online service provider performs its operations in different ways. For example, the legal obligations may require certain actions to be performed (e.g., a particular level of authentication before performing certain transactions for a user, a particular encryption level for storing certain types of data, etc.). Failure to comply with the legal obligations may lead to monetary or legal penalty for the online service provider. Thus, each of the legal obligations may create certain risk for the online service provider. In some embodiments, software controls (a software module or software programing code that implements logic to perform a specific function, such as performing an authentication workflow, performing a data encryption process, etc.) can be implemented within one or more software processes to mitigate the risk associated with the legal obligation.

However, as discussed herein, determining which software processes may be impacted by a legal obligation and determining software controls to implement within the software processes can be a great burden to the online service provider, as it could involve substantial effort from personnel across different teams and departments (e.g., the legal team, various business operations teams, various software development teams, etc.). Thus, according to various embodiments of the disclosure, the recommender module 208 may recommend one or more software controls to be complemented in software processes of the online service provider to mitigate the risks associated with the legal obligations that impacted the operations of the online service provider.

In some embodiments, the recommender module 208 may use an ensemble machine learning model that includes two or more different machine learning models configured to predict software processes that are likely impacted by a legal obligation and software controls that can be implemented within the software processes for mitigating the risk associated with the legal obligation. In some embodiments, the recommender module 208 may also provide a feedback loop such that the ensemble machine learning model may be re-trained continuously based on actual selection of software controls selected by a user (e.g., an employee of the online service provider) such that the performance of the ensemble machine learning model can be further improved over time.

Figure 6:
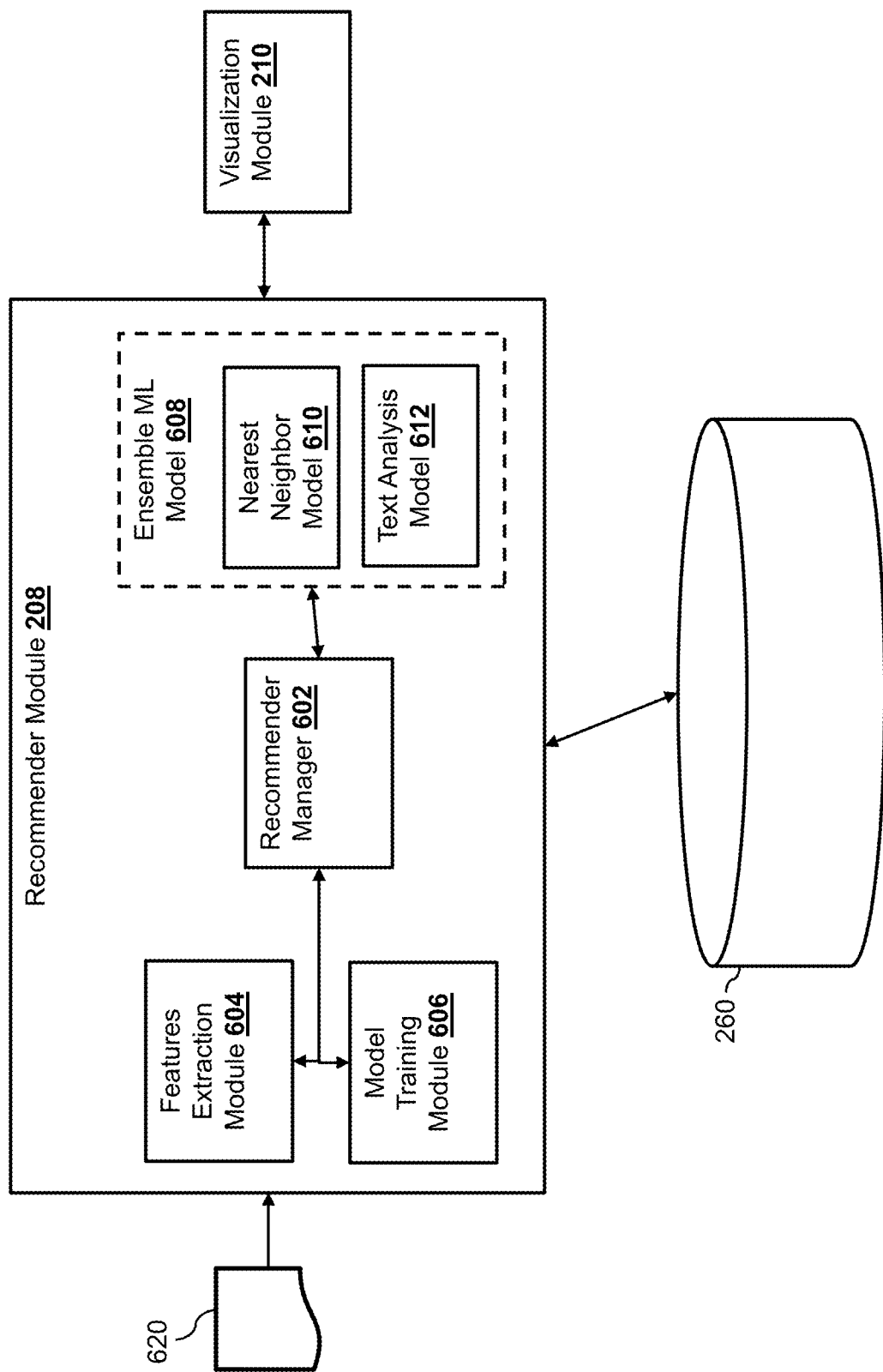
FIG. 6 is a block diagram illustrating a recommender module according to an embodiment of the present disclosure.

FIG. 6 illustrates a block diagram of the recommender module 208 according to an embodiment of the disclosure. The recommender module 208 includes a recommender manager 602, a features extraction module 604, a model training module 606, and an ensemble machine learning (ML) model 608. The recommender module 208 may be communicatively coupled with the data storage 260, which stores information associated with existing legal obligations that have impacted the operations of the online service provider, the software processes that are impacted by the existing legal obligations, and the software controls that have been implemented to mitigate the risks associated with the existing legal obligations. As discussed herein, the ensemble ML model 608 included in the recommender module 208 may be configured to predict software controls for a legal obligation. The ensemble ML model 608 may include different machine learning models. Each of the machine learning models in the ensemble ML model 608 may be configured to determine existing legal obligations that are relevant to an input legal obligation (e.g., having similarities with the input legal obligations that exceed a threshold, etc.) using a different methodology/algorithm. In this example, the ensemble ML model 608 may include a nearest neighbor model 610 configured to determine similar existing legal obligations based on general attributes of the input legal obligation, and a text analysis model 612 configured to determine similar existing legal obligations based on text attributes corresponding to the text of the input legal obligation. In some embodiments, the model training module 606 may be configured to train the nearest neighbor model 610 and the text analysis model 612 to determine similar existing legal obligations based on data associated with the existing legal obligations stored in the data storage 260.

The recommender manager 602 may receive an input legal obligation (e.g., a legal obligation 620) that has been determined by the relevancy determination module 206 to be relevant to the online service provider. The legal obligation 620 may be received by the recommender module 208 in a data structure similar to the data structures 502 and 504, which includes data associated with the legal obligation 620, such as the text corresponding to the legal obligation 620 that was extracted from a regulation document (e.g., the document 302), a citation that shows a location within the document 302 from which the text corresponding to the legal obligation 620 was extracted, and attributes associated with the legal obligations 620 such as an area of law, a risk type, a source of the legal obligation 620, a relevancy score (determined by the relevancy determination module 206), and other attributes.

In some embodiments, the features extraction module 604 may extract features associated with the legal obligation 620. The features may be subsequently used by one or more machine learning models in the ensemble ML model 608 to predict software controls for the legal obligation 620. For example, the features extraction module 604 may obtain features of the legal obligation 620 from attributes stored in the data structure corresponding to the legal obligation 620. In some embodiments, the features extraction module 604 may extract additional features for the legal obligation 620. For example, the features extraction module 604 may obtain additional information about the legal obligation 620 based on the source of the regulation included in the data structure. The features extraction module 604 may access an agency server (e.g., the agency server 180 or the agency server 190) corresponding to the source of the regulation and/or other servers (e.g., servers associated with news media, etc.) to obtain the additional information, such as whether the regulation from which the legal obligation 620 was extracted is related to another regulation (e.g., this regulation may mirror or impose similar obligations as another regulation in another jurisdiction, etc.), how likely that this regulation will be enforced, etc.

In some embodiments, the ensemble ML model 608 may pass the features of the input legal obligation 620 to the nearest neighbor model 610. In some embodiments, the nearest neighbor model 610 may create a multi-dimensional space, where each dimension in the multi-dimensional space corresponds to a distinct feature. The nearest model 610 may use the features associated with the input legal obligation 620 to determine a point within the multi-dimensional space. The nearest neighbor model 610 may also access features associated with existing legal obligations (e.g., previously extracted from the existing legal obligations and stored in the data storage 260). The nearest neighbor model 610 model may then determine, for each of the existing legal obligations, a position within the multi-dimensional space based on the features.

Using one or more nearest neighbor algorithms, the nearest neighbor model 610 may select, from the existing legal obligations stored in the data storage 260, a group of existing legal obligations that are relevant to the input legal obligation 620. In some embodiments, the nearest neighbor model 610 may select the existing legal obligations having positions in the multi-dimensional space that are within a predetermined threshold distance from the position of the input legal obligation 620.

In some embodiments, the ensemble ML model 608 may pass the text corresponding to the input legal obligation 620 to the text analysis model 612. In some embodiments, the text analysis model 612 may analyze the words in the text to derive different text-based attributes, such as a frequency of each word within the text, for the input legal obligation 620. The text-based attributes may include different values (e.g., weights) associated with different words that appear in the text corresponding to the input legal obligation 620. In some embodiments, the text analysis model 612 may also take into account the frequency of those words in the texts associated with the existing legal obligations stored in the data storage 260, when determining the text-based attributes of the input legal obligation 620. In a non-limiting example, the text analysis model 612 may use a term frequency-inverse document frequency (tf-idf) approach in generating the text-based attributes for the input legal obligation 620. The text analysis model 612 may then determine existing legal obligations that are relevant to the input legal obligation 620 based on the text-based attributes. For example, the text analysis model 620 may determine that an existing legal obligation is relevant to the input legal obligation 620 when the text-based attributes are within a predetermined deviation from each other.

In some embodiments, in addition to using the text corresponding input legal obligation 620, the text analysis model 612 may also use the features associated with the input legal obligations 620 (e.g., the features used by the nearest neighbor model 610) to generate the text-based attributes. For example, the text analysis model 612 may convert each of the features associated with the legal obligation 620 into text and append the converted text to the text corresponding to the input legal obligation 620. This way, the text that is extracted from the regulation document 302, and the text converted from the features of the legal obligation 620 can be analyzed together to generate the text-based attributes for the legal obligation 620.

After determining a set of existing legal obligations that are relevant to the input legal obligation 620, the recommender manager 202 may determine a set of software controls that have been previously implemented in software processes of the service provider server 130 in order to mitigate risks associated with the set of existing legal obligations. As discussed herein, a software control includes logic for performing an action based on a requirement associated with a legal obligation, which can be implemented in one or more software processes (or software workflows). Example software controls may include logic for encrypting certain types of data before the data is stored or transmitted, logic for restricting the performance of a certain type of transactions based on transaction attributes such as a type of products, a geographical region, a transaction amount, etc., logic for reporting an event to a third-party (e.g., to a government agency) in response to the occurrence of the event, etc.

In some embodiments, the recommender manager 602 may determine a score for each of the software controls based on one or more factors, such as a number of software processes in which the software control is implemented, a number of obligations that the software control is implemented for, a frequency of use, an type of risk associated with the legal obligations for which the software control is implemented, an area of law associated with the legal obligations for which the software control is implemented, and other factors. The recommender manager 602 may rank the software controls based on the score. The recommender manager 602 may select a subset of the software controls for recommending to a user associated with the online service provider based on the ranking (e.g., the top 20 software controls, the top 50 software controls, etc.).

The GRC manager 202 may then use the visualization module 210 to present or communicate the recommendation of the software controls to a device associated with the online service provider, such as the device 150. The visualization module 210 may be configured to present, in a graphical user interface, the subset of software controls that are necessary to implement within one or more software processes of the service provider server 130 in order to reduce the risk associated with the input legal obligation 620. In some embodiments, instead of simply presenting the recommended software controls, the visualization module 210 may be configured to present an explainable visual interface that illustrates the recommended software controls for reducing the risk associated with the input legal obligation 620 and how the recommended software controls are determined.

For example, the visualization module 210 may present the recommendation in a three-tier layout to illustrate the determination paths from the input legal obligation 620 to the output recommended software controls. The visualization module 210 may present a graphical element representing the input legal obligation 620 in the first tier of the three-tier layout. The visualization module 210 may present obligation graphical elements representing the subset of existing legal obligations relevant to the input legal obligation 620 in the second tier of the three-tier layout. The visualization module 210 may present control graphical elements representing the subset of software controls recommended to the user in the third tier of the three-tier layout.

Figure 7:
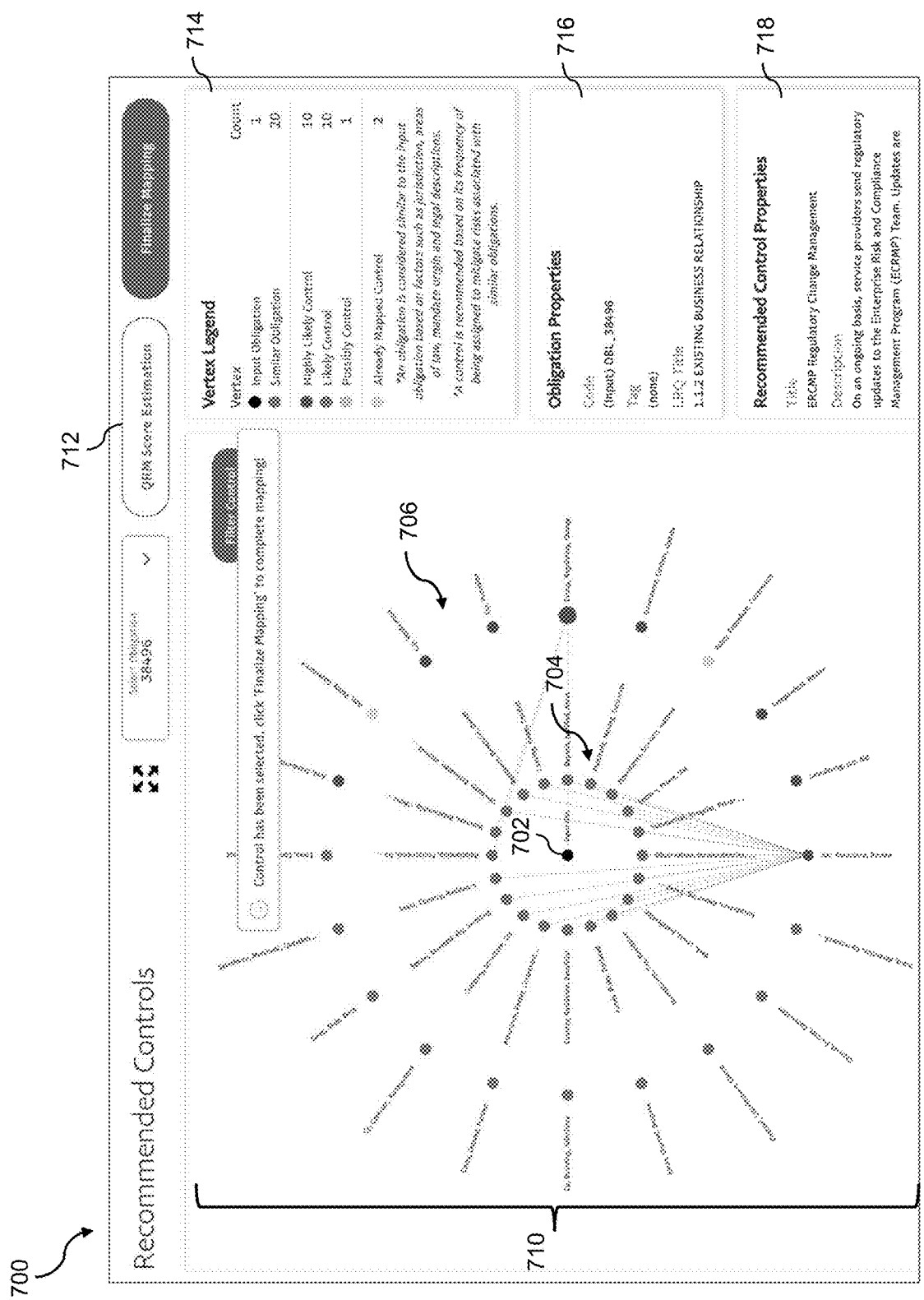
FIG. 7 illustrates an explainable visual user interface for presenting recommended software controls outputted by an ensemble machine learning model according to an embodiment of the present disclosure.

FIG. 7 illustrates an example graphical user interface 700 that presents the recommended software controls based on a three-tier layout according to an embodiment of the disclosure. In some embodiments, the graphical user interface 700 may be generated by the visualization module 210. As shown in FIG. 7, the graphical user interface 700 includes presenting a three-tier layout 710, comprising a graphical representation 702 representing the input legal obligation 620 in a first tier of the three-tier layout 710, obligation graphical elements representing existing legal obligations for which the recommended software controls implemented in a second tier 704 of the three-tier layout 710, and controls graphical elements representing the recommended software controls in a third tier 706 of the three-tier layout 710. In this example, the three-tier layout 710 is arranged in a circular arrangement where the graphical element 702 in the first tier is disposed in the center of the three-tier layout 710, the obligation graphical elements in the second tier 704 are disposed in a circular manner surrounding the graphical element 702, and the control graphical elements representing in the third tier 706 are disposed in a circular manner surrounding the second tier 704. While the three-tier layout 710 illustrated in FIG. 7 shows the upper tiers (e.g., the second tier 704 and the third tier 706) of the three-tier layout surrounding the lower tier(s) in a circular manner, it has been contemplated that the three-tier layout can be presented differently in some embodiments. For example, in some embodiments, the visualization module 210 may dispose the graphical elements of the upper tiers on the graphical user interface to surround the graphical element(s) in the lower tier(s) in other shape (e.g., a rectangle, an oval, a triangle, or an irregular shape, etc.). In some embodiments, the visualization module 210 may dispose the tiers in the three-tier layout in an order vertically or horizontally, such that a higher tier is placed above (or below) a lower tier, or that a higher tier is placed to the left (or to the right) of a lower tier. The three-tier layout can be presented differently as long as the graphical elements of the same tiers and graphical elements of different tiers can be visually identified.

In some embodiments, the visualization module 210 may receive filtering criteria from a user for filtering the set of software controls being presented on the GUI 700. For example, the user may specify that one or more areas of law (or that existing legal obligations must be associated with the same area of law as the input legal obligation 620), one or more risk types (or that the existing legal obligations must be associated with the same risk type as the input legal obligation 620), and other types of filtering criteria. Upon receiving the filtering criteria, the visualization module 210 may determine existing legal obligations that are both relevant to the input legal obligation 620 and satisfy the filtering criteria (may filter out one or more existing legal obligations that do not satisfy the filtering criteria). The visualization module 210 may update GUI 700, for example, by removing one or more obligation graphical elements and one or more control graphical elements based on the filtered set of existing legal obligations. The visualization module 210 may then modify the GUI 700 by presenting only the updated set of recommended software controls.

In addition to showing the graphical elements representing the input legal obligation 620, the existing legal obligations that are relevant to the legal obligation 620, and the recommended software controls, the visualization module 210 of some embodiments may also present different metrics associated with the three-tier layout presentation 710. For example, in the presentation area 714 of the graphical user interface 700, the visualization module 210 may present a number of existing legal obligations that are similar to the input legal obligation 620 and represented in the second tier 704 (e.g., 20) and the number of the recommended software controls (e.g., 30). The visualization module 210 may also break down the number of recommended software controls into several categories, such as "highly likely controls," "likely controls," and "possibly controls". As discussed herein, the recommender module 208 may categorize the software controls based on the scores determined for the software controls. For example, the recommender module 208 may categorize software controls having scores above a first threshold as "highly likely controls," categorize software controls having scores between the first threshold and a second threshold as "likely controls," and categorize software controls having scores below the second threshold as "possibly controls." The visualization module 210 may then present the number of software controls that are being categorized in each of the categories in the presentation area 714 of the graphical user interface 700.

In some embodiments, once a graphical element representing a legal obligation is selected, the visualization module 210 may present, in the presentation area 716, attributes of the selected legal obligation, such as a title of the regulation from which the legal obligation is extracted, an area of law, a risk type, etc. Similarly, once a graphical element representing a software control is selected, the visualization module 210 may present, in the presentation area 718, attributes of the selected software control, such as a description of the logic being implemented by the software control, a type of data being affected by the software control, a business and/or a software process (or workflow) being affected by the software control, etc.

In some embodiments, the visualization module 210 may illustrate, in the graphical user interface 700, the relationships between the input legal obligation 620 and each of the existing legal obligations that are relevant (e.g., similar) to the input legal obligation 620, and the relationships between the existing legal obligations and the recommended software controls. For example, the relationships may be represented by connections between the graphical elements in the three-tier layout 710. In some embodiments, the visualization module 210 may include, in the graphical user interface 700, a connection between two graphical elements to represent a relationship between the obligation and/or the software control represented by the two graphical elements. For example, the visualization module 210 may include a connection between the graphical element 702 representing the input legal obligation 620 and each of the obligation graphical elements in the second tier 704 representing the similar existing legal obligations to represent the relationship between the input legal obligation 620 and each of the existing legal obligations.

In some embodiments, the connections presented on the graphical user interface 700 may also indicate attributes of the relationships. For example, the visualization module 210 may present the connections differently (e.g., different colors, different thicknesses, different patterns, etc.) to indicate a strength of the relationship (e.g., a degree of similarity) between the input legal obligation 620 and each of the existing legal obligations. A thicker connection presented on the graphical user interface 700 may indicate a stronger relationship (e.g., a higher degree of similarity) between the input legal obligation 620 and the existing legal obligation.

Similarly, the visualization module 210 may include a connection between each of the graphical elements in the third tier 706 representing a software control and one or more obligation graphical elements in the second tier 704 representing one or more existing legal obligations for which the software control is implemented. In some embodiments, the visualization module 210 may present the connections differently (e.g., different colors, different thicknesses, different patterns, etc.) to indicate a strength of the relationship (e.g., how many software processes in which the software control has been implemented for the existing legal obligation) between the software control and the existing legal obligation. A thicker connection presented on the graphical user interface 700 may indicate a higher number of software processes in which the software control has been implemented for the existing legal obligation.

In some embodiments, the visualization module 210 may present the control graphical elements differently (e.g., different sizes, different colors, etc.) to represent different characteristics of the software controls. For example, the visualization module 210 may present the control graphical elements differently to indicate a number of software processes in which the software control has been implemented, such that a control graphical element may be presented in a first manner (e.g., a larger size, a first color) when the number of software processes in which the software has been implemented exceeds a threshold number, and the control graphical element may be presented in a second manner (e.g., a smaller size, a second color) when the number of software processes in which the software has been implemented is below a threshold number.

Furthermore, the visualization module 210 may configure the graphical elements presented on the graphical user interface 700 to be interactive. In some embodiments, each of the graphical elements representing a legal obligation or a software control in the graphical user interface 700 may be selectable by a user. The selection of a graphical element may trigger a modification to the graphical user interface 700 by the visualization module 210. For example, upon detecting a selection of an obligation graphical element in the second tier 704 representing an existing legal obligation, the visualization module 210 may modify the graphical user interface 700 by highlighting control graphical element(s) in the third tier 706 corresponding to software control(s) that have been implemented for the existing legal obligation (e.g., changing a color of the control graphical element(s), increasing the size of the control graphical element(s), etc.). The visualization module 710 may also present, on the graphical user interface 700, information that illustrates how the existing legal obligation is determined to be associated with the input legal obligation 620. For example, the visualization module 210 may present the shared attributes between the input legal obligation 620 and the selected existing legal obligation and/or the similarity scores determined by the ensemble ML model 608.

In another example, upon detecting a selection of a control graphical element in the third tier 706 that represents a software control, the visualization module may modify the graphical user interface 700 by highlighting one or more obligation graphical elements in the second tier 704 that correspond to one or more existing legal obligations for which the software control has been implemented (e.g., changing a color of the obligation graphical element(s), increasing the size of the obligation graphical element(s), etc.).

In some embodiments, the visualization module 210 may present a risk reduction score for one or more software controls upon receiving a request via the graphical user interface 700. For example, after selecting one or more control graphical elements in the third tier 706 that correspond to one or more software controls, a user may request for generating a risk reduction score for the selected software control by selecting a "QRM Score Estimation" button 712. Upon detecting a selection of the "QRM Score Estimation" button 712, the visualization module 210 may pass data associated with the software controls corresponding to the selected control graphical elements to the recommender module 208 for determining a risk reduction score based on the software controls. The risk reduction score may represent an extent that the risk associated with the input legal obligation 620 is reduced based on implementations of the software controls in one or more software processes of the service provider server 130.

Different embodiments of the recommender module 208 may use different techniques to determine the risk reduction score. In some embodiments, the recommender module 208 may determine a risk reduction score for each of the selected software controls. The risk reduction score for a software control may be determined based on one or more factors, such as a number of software processes in which the software control has been implemented, a number of past legal obligations for which the software control has been implemented, an execution frequency (e.g., how often is the software control executed within the software processes), whether the software control provides automatic processing of data and/or transaction or requires manual intervention, etc. Each of the factors may be assigned a certain weight. When the recommender module 208 determines that the software control has been implemented in a particular number of software processes, the recommender module 208 may determine a score for the software control by multiplying the particular number by a corresponding weight. When the recommender module 208 determines that the software control has been implemented for a particular number of existing legal obligations, the recommender module 208 may multiply the particular number by another corresponding weight, and add that number to the score associated with the software control. Similarly, the recommender module 208 may multiply the execution frequency of the software control by another corresponding weight, and add that number to the score associated with the software control. In some embodiments, the recommender module 208 may add a value to the score when it is determined that the software control provides automatic processing and/or subtract a value from the score when it is determined that the software control requires manual intervention.

After determining the individual risk reduction score for each of the software controls, the recommender module 208 may rank the software controls based on the risk reduction scores. In some embodiments, the recommender module 208 may determine a weight for each of the software control based on a ranking of the software control. The weight may be determined in proportion to the ranking (e.g., more weight is given to software controls having higher rankings). For example, a 100% weight may be given to the software control that is ranked first. A reduced weight (e.g., 80%) may be given to the software control that is ranked second. The recommender module 208 may also determine a cutoff ranking (e.g., fifth, sixth, etc.) where 0% of weight is given to software controls that rank below the cutoff ranking. In some embodiments, the recommender module 208 may determine the risk reduction score for the selected software controls based on the weighted individual risk reduction scores. The recommender module 208 may pass the risk reduction score to the visualization module 210 for presenting on the graphical user interface 700.

Based on the interactive presentation of the recommended software controls, a user can make an intelligent or informed decision on whether to accept (in full or in part) or reject the recommendation. In some embodiments, the visualization module 210 enables the user to select one or more recommended software controls for implementing within one or more software processes of the service provider server 130. Upon receiving the selection from the user, the visualization module 210 may pass the selection to the recommender module 208 as feedback information to re-train the ensemble ML module 608 for predicting software controls for a legal obligation. The recommender module 208 may also use the selection as feedback to modify the algorithms and/or parameters that the recommender manager 602 use to score and rank the software controls.

In some embodiments, upon receiving the selection from the user, the GRC manager 202 may also implement the selected software controls in software processes associated with the service provider server 130 to mitigate the risk associated with the legal obligation 620. Since the software controls have already been implemented for other existing legal obligations, in some embodiments, the GRC manager 202 may extract the software controls that have been implemented in one or more software processes. The GRC manager 202 may modify the software controls such that they can be implemented within the software processes that are impacted by the legal obligation 620. For example, a software control may have been implemented in a first software process that was impacted by an existing legal obligation. The GRC manager 202 may determine a second software process that is impacted by the input legal obligation 620. Thus, the GRC manager 202 may implement that same software control within the second software process to mitigate the risk associated with the input legal obligation 620.

Figure 8:
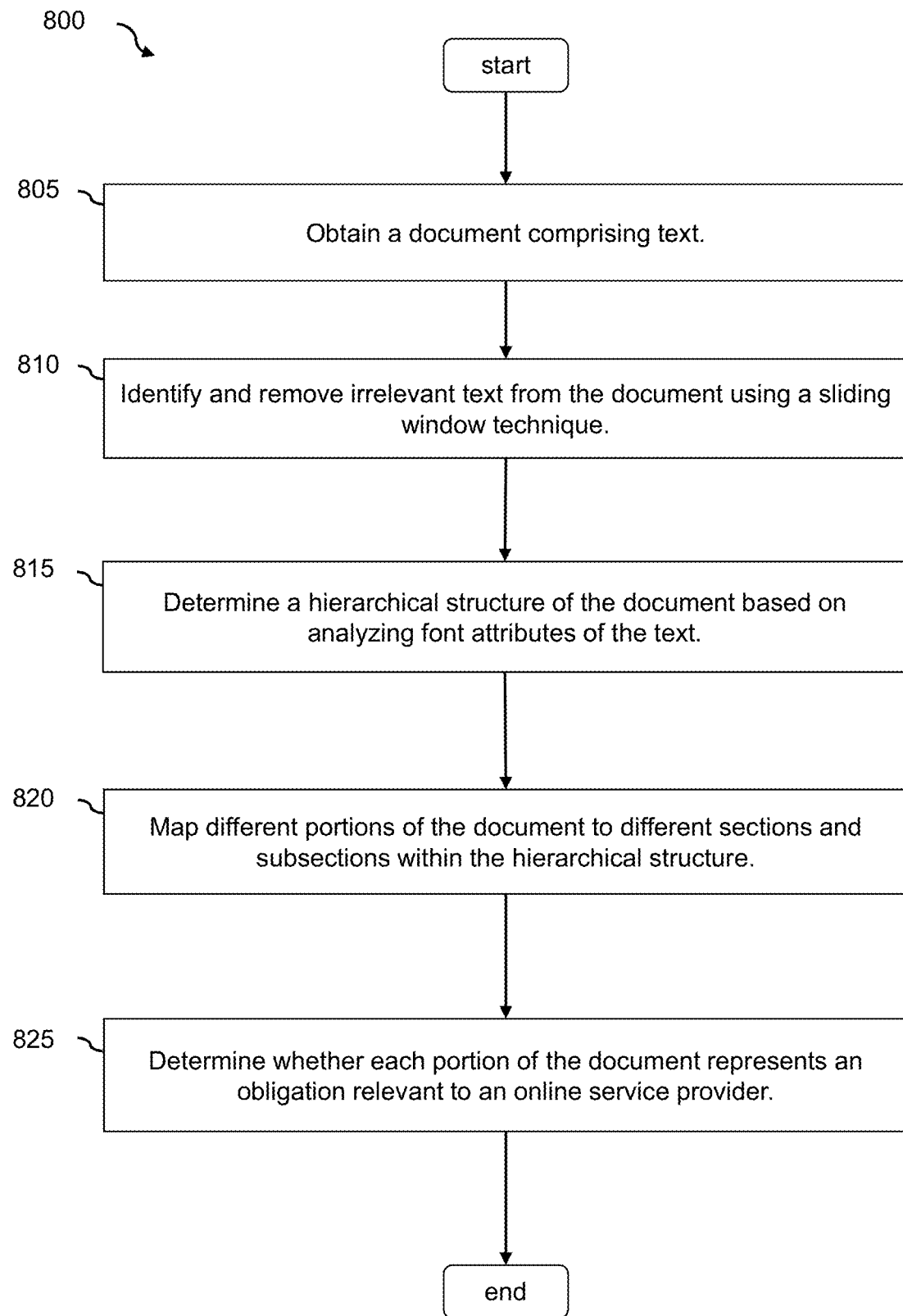
FIG. 8 is a flowchart showing a process of processing a regulation document according to an embodiment of the present disclosure.

FIG. 8 illustrates a process 800 for processing a regulation document according to various embodiments of the disclosure. In some embodiments, at least a portion of the process 800 may be performed by the GRC module 132. The process 800 may begin by obtaining (at step 805) a document comprising text. For example, the GRC manager 202 may communicate with the agency servers 180 and/or 190 corresponding to government agencies to determine if a new regulation or a change to an existing regulation is promulgated, such as by accessing the agency servers 180 and/or 190 or receiving a notification from the agency servers 180 and/or 190. If it is determined that a new regulation or a change to an existing regulation is promulgated, the GRC manager 202 may retrieve a document (e.g., the document 302) associated with the regulation.

The process 800 then identifies and removes (at step 810) irrelevant text from the document using a sliding window technique. For example, the data pre-processing module 204 may traverse the pages of the document 302 to analyze the document 302 one page at a time. When the data pre-processing module 204 analyzes a page, the data pre-processing module 204 may generate a sliding window to encompass neighboring pages (consecutive or alternate pages preceding and/or succeeding the page). The data pre-processing module 204 may analyze lines of text from the current page against lines of text from other pages encompassed in the sliding window. Based on the analysis, the data pre-processing module 204 may determine whether any lines of text in the current page contains irrelevant text (e.g., headers and footers, etc.), and may remove the irrelevant text from the current page.

The process 800 then determines (at step 815) a hierarchical structure of the document based on analyzing attributes of the text and maps (at step 820) different portions of the document to different sections and subsections in the hierarchical structure. For example, the data pre-processing module 204 may parse the document 302. The data pre-processing module 204 may identify a table of content section in the document 302 based on the attributes, such as font, of the text within the table of content section. The data pre-processing module 204 may determine a hierarchical structure of the document 302 based on the table of content. The hierarchical structure may include multiple sections and subsections. Thus, the data pre-processing module 204 may map different portions of the text within the document 302 to the different sections and subsections of the hierarchical structure.

In some embodiments, the data pre-processing module 204 may determine different legal obligation candidates corresponding to the different subsections of the document 302. In some embodiments, the data pre-processing module 204 may generate a legal obligation data structure for each legal obligation candidate. A legal obligation data structure may store a corresponding portion of the text, a citation, a section identifier within the document 302, and metadata comprising various attributes of the legal obligation candidate such as an area of law, a risk type, etc.

The process 800 then determines (at step 825) whether each portion of the text represents an obligation relevant to the online service provider. For example, after extracting the legal obligation candidate from the document 302 and generating the legal obligation data structure for each legal obligation candidate, the data pre-processing module 204 may pass the legal obligation candidates (in the form of the legal obligation data structures) to the relevancy determination module 206 for determining which legal obligation candidates are relevant to the online service provider of the service provider server 130. In some embodiments, the relevancy determination module 206 may use a machine learning model to determine if a legal obligation is relevant to the online service provider based on the data included within the legal obligation data structure.

Figure 9:
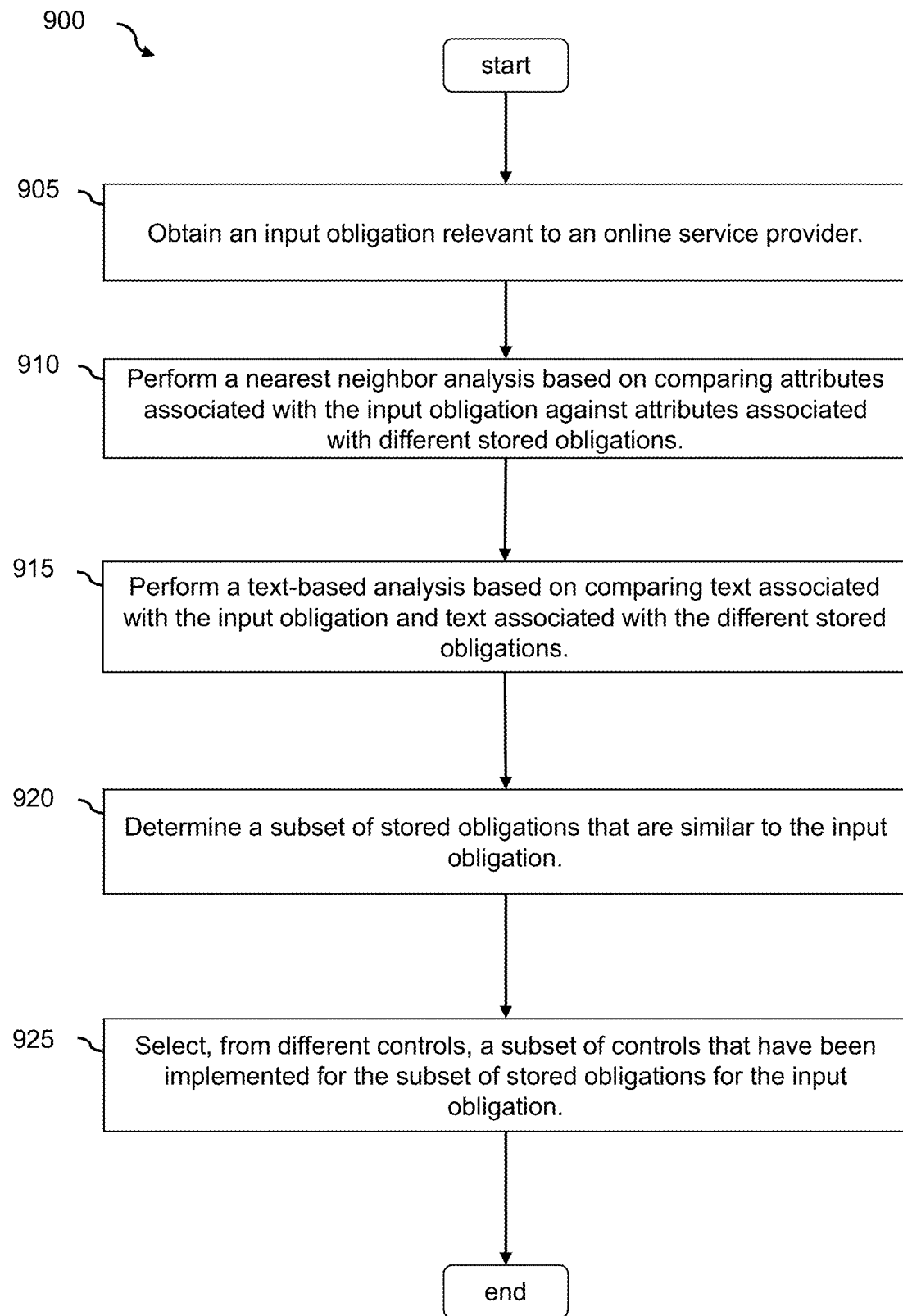
FIG. 9 is a flowchart showing a process of recommending software controls for a legal obligation according to an embodiment of the present disclosure.

FIG. 9 illustrates a process 900 for recommending software controls for an input legal obligation according to various embodiments of the disclosure. In some embodiments, at least a portion of the process 900 may be performed by the GRC module 132. The process 900 may begin by obtaining (at step 905) an input legal obligation relevant to the online service provider. For example, after the relevancy determination module 206 determines one or more legal obligations that are relevant to the online service provider, the GRC manager 202 may provide the one or more legal obligations, one at a time or in parallel, as an input legal obligation to the recommender module 208 for recommending software controls that can be implemented in one or more software processes of the service provider server 130 to mitigate a risk associated with the input legal obligation.

The process 900 then performs (at step 910) a nearest neighbor analysis based on comparing attributes associated with the input obligation against attributes associated with different stored obligations and performs (at step 915) a text-based analysis based on comparing text associated with the input obligation against text associated with the different stored obligations. For example, the feature extraction module 604 may extract features associated with the input legal obligation 620. The recommender manager 602 may then use the ensemble ML model 608 to predict software controls for the input legal obligation 620. The ensemble ML Model 608 may include multiple machine learning models, such as a nearest neighbor model 610 and a text analysis model 612. The nearest neighbor model 610 may be configured to predict existing legal obligations stored in the data storage 260 that are similar (or relevant to the input legal obligation 620) based on the features extracted from the input legal obligation 620. The text analysis model 612, on the other hand, may be configured to predict existing legal obligations stored in the data storage 260 that are similar (or relevant to the input legal obligation 620) based on the text corresponding to the input legal obligation 620.

The process 900 then determines (at step 920) a subset of stored obligations that are similar to the input obligation and selects (at step 925), from different controls, a subset of controls that have been implemented for the subset of stored obligations for the input obligation. For example, the recommender manager 602 may determine existing legal obligations that are relevant (or similar) to the input legal obligation 620 based on the outcomes from the nearest neighbor model 610 and the text analysis model 612. The recommender manager 602 may identify the software control that have been implemented within software processes associated with the service provider server 130 for the existing legal obligations, and recommend the identified software control for mitigating the risk associated with the input legal obligation 620.

Figure 10:
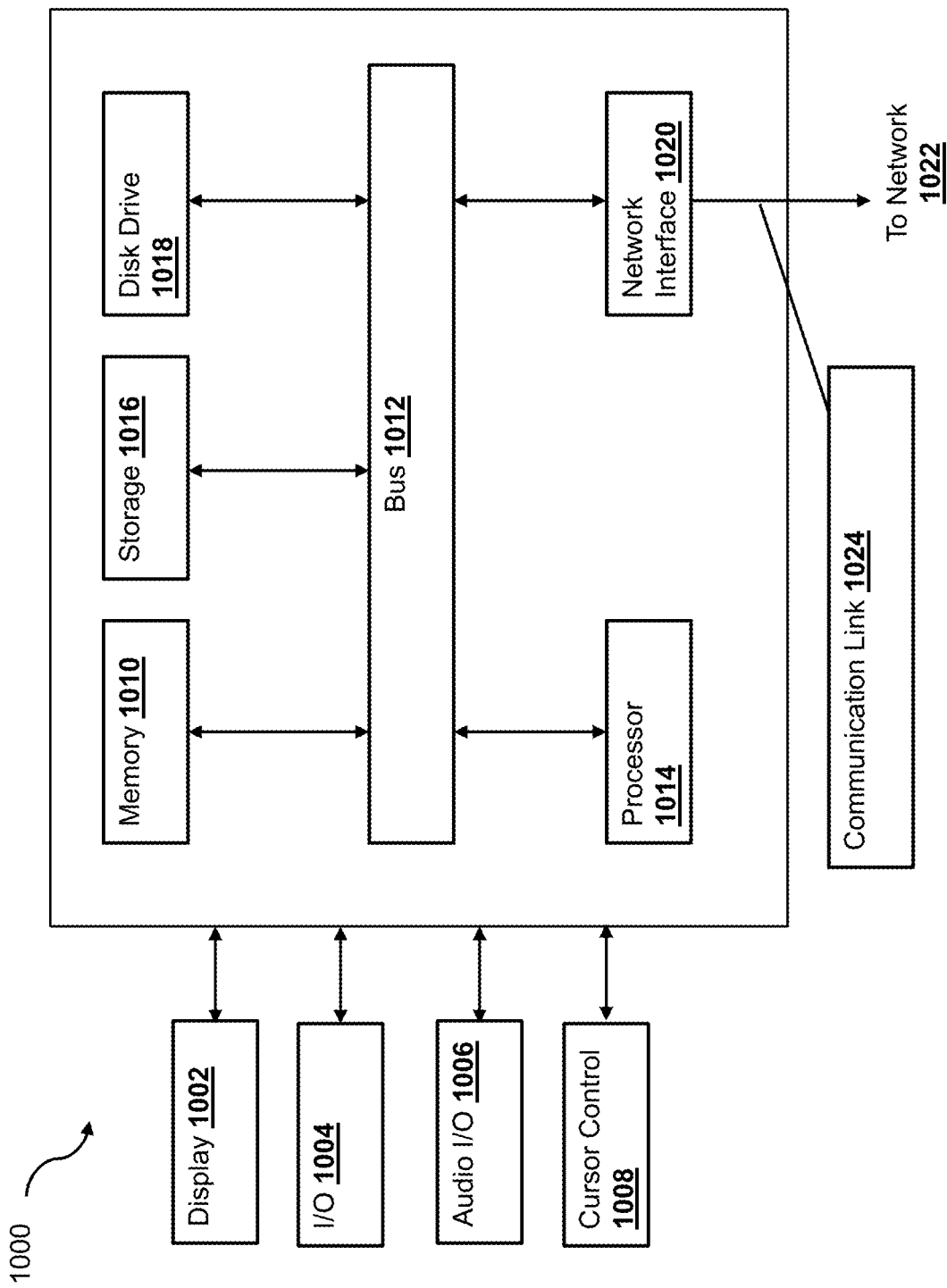
FIG. 10 is a block diagram of a system for implementing a device according to an embodiment of the present disclosure.

FIG. 10 is a block diagram of a computer system 1000 suitable for implementing one or more embodiments of the present disclosure, including the service provider server 130, the merchant server 120, and the user device 110, the device 150, and the agency servers 180 and 190. In various implementations, each of the user device 110 and the device 150 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices/servers 110, 120, 130, 150, 180, and 190 may be implemented as the computer system 1000 in a manner as follows.

The computer system 1000 includes a bus 1012 or other communication mechanism for communicating information data, signals, and information between various components of the computer system 1000. The components include an input/output (I/O) component 1004 that processes a user (i.e., sender, recipient, service provider) action, such as selecting keys from a keypad/keyboard, selecting one or more buttons or links, etc., and sends a corresponding signal to the bus 1012. The I/O component 1004 may also include an output component, such as a display 1002 and a cursor control 1008 (such as a keyboard, keypad, mouse, etc.). The display 1002 may be configured to present a login page for logging into a user account or a checkout page for purchasing an item from a merchant. An optional audio input/output component 1006 may also be included to allow a user to use voice for inputting information by converting audio signals. The audio I/O component 1006 may allow the user to hear audio. A transceiver or network interface 1020 transmits and receives signals between the computer system 1000 and other devices, such as another user device, a merchant server, or a service provider server via a network 1022, such as network 160 of FIG. 1. In one embodiment, the transmission is wireless, although other transmission mediums and methods may also be suitable. A processor 1014, which can be a micro-controller, digital signal processor (DSP), or other processing component, processes these various signals, such as for display on the computer system 1000 or transmission to other devices via a communication link 1024. The processor 1014 may also control transmission of information, such as cookies or IP addresses, to other devices.

The components of the computer system 1000 also include a system memory component 1010 (e.g., RAM), a static storage component 1016 (e.g., ROM), and/or a disk drive 1018 (e.g., a solid-state drive, a hard drive). The computer system 1000 performs specific operations by the processor 1014 and other components by executing one or more sequences of instructions contained in the system memory component 1010. For example, the processor 1014 can perform the document ingesting and computer control recommendation functionalities described herein according to the processes 800 and 900.

Logic may be encoded in a computer readable medium, which may refer to any medium that participates in providing instructions to the processor 1014 for execution. Such a medium may take many forms, including but not limited to, non-volatile media, volatile media, and transmission media. In various implementations, non-volatile media includes optical or magnetic disks, volatile media includes dynamic memory, such as the system memory component 1010, and transmission media includes coaxial cables, copper wire, and fiber optics, including wires that comprise the bus 1012. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1000. In various other embodiments of the present disclosure, a plurality of computer systems 1000 coupled by the communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled with the non-transitory memory and configured to read instructions from the non-transitory memory to cause the system to perform operations comprising:
   obtaining first data associated with a first obligation, wherein the first data comprises (i) text data and (ii) a set of attributes corresponding to a set of attribute types and associated with the first obligation;
   analyzing the first data associated with the first obligation and second data associated with a plurality of stored obligations for which a plurality of controls has been implemented in one or more software processes to mitigate risks associated with the plurality of stored obligations;
   determining, from the plurality of stored obligations, a subset of stored obligations based on a result of the analyzing;
   identifying, from the plurality of controls, one or more controls that have been implemented in one or more software processes to mitigate risks associated with the subset of stored obligation as control candidates for the first obligation; and
   providing, on the user device, a graphical user interface (GUI) that displays the control candidates for the first obligation.

2. The system of claim 1, wherein the operations further comprise:
   receiving a selection of at least one control from the control candidates via the GUI; and
   implementing the at least one control within the software process of the online service provider.

3. The system of claim 2, wherein the operations further comprise:
   generating software code corresponding to the at least one control based on a format corresponding to a source code of the software process; and
   integrating the software code into the software process.

4. The system of claim 2, wherein the analyzing is performed using one or more machine learning models, and wherein the operations further comprise:
   providing the selection of the at least one control as a feedback to re-train the one or more machine learning models.

5. The system of claim 1, wherein the first obligation is a legal obligation, and wherein the set of attribute types comprises at least one of an area of law, a category of legal obligation, a jurisdiction that imposes the legal obligation, or an agency that promulgated the legal obligation.

6. The system of claim 1, wherein the operations further comprise:
   ranking the one or more controls based on a usage frequency in the one or more software processes; and
   presenting the ranking on the GUI.

7. The system of claim 1, wherein the analyzing comprises performing a text-based analysis, and wherein the operations further comprise:
   converting each attribute in the set of attributes associated with the first obligation into a corresponding text;
   concatenating the text corresponding to the set of attributes in a predetermined order; and
   appending the concatenated text to the text data associated with the first obligation before performing the text-based analysis.

8. A method comprising:
   extracting, by one or more hardware processors, a first obligation from a regulation document comprising text data;
   determining, by the one or more hardware processors for the first obligation, first data comprising (i) a portion of the text data corresponding to the first obligation and (ii) a set of attributes corresponding to a set of attribute types and associated with the first obligation;
   performing, by the one or more hardware processors, a plurality of analyses, on the first data associated with the first obligation and second data associated with a plurality of stored obligations for which a plurality of software controls has been implemented in one or more software processes to mitigate risks associated with the plurality of stored obligations;

determining, by the one or more hardware processors from the plurality of stored obligations, a subset of stored obligations based on a result of performing the plurality of analyses;

identifying, by the one or more hardware processors from the plurality of software controls, one or more software controls that have been implemented in one or more software processes to mitigate risks associated with the subset of stored obligation as control candidates for the first obligation; and providing, by the one or more hardware processors on the user device, a graphical user interface (GUI) that displays the control candidates for the first obligation.

9. The method of claim 8, wherein the performing the plurality of analyses comprises:

performing a multi-dimensional attribute analysis based on the set of attributes corresponding to the first obligation; and performing a text-based analysis based on the portion of the text data.

10. The method of claim 9, wherein the performing the multi-dimensional attribute analysis comprises:

generating a multi-dimensional space having a plurality of dimensions corresponding to the set of attribute types;

determining, for the first obligation, a first position within the multi-dimensional space based on the set of attributes associated with the first obligation; and determining, for a corresponding one of the plurality of stored obligations, a corresponding second position within the multi-dimensional space based on attributes associated with the corresponding one of the plurality of stored obligations.

11. The method of claim 10, wherein the subset of stored obligations is determined based in part on distances between the first position and the corresponding second positions within the multi-dimensional space.

12. The method of claim 9, wherein the performing the text-based analysis comprises deriving text-based attributes different from the set of attributes from the portion of the text data.

13. The method of claim 8, wherein the one or more controls comprises a control that restricts a type of transaction performed by an online service provider.

14. The method of claim 8, wherein the one or more software controls comprises a software control that when executed causes data corresponding to a particular data type obtained via a user interface of an online service provider to be encrypted before storing the encrypted data in a data storage of the online service provider.

15. A non-transitory machine-readable medium having stored thereon machine-readable instructions executable to cause a machine to perform operations comprising:

obtaining first data associated with a first obligation, wherein the first data comprises (i) text data extracted from a document and (ii) a set of attributes corresponding to a set of attribute types and associated with the first obligation;

analyzing the first data associated with the first obligation and second data associated with a plurality of stored obligations for which a plurality of controls has been implemented in one or more software processes of an online service provider to mitigate risks associated with the plurality of stored obligations;

determining, from the plurality of stored obligations, a subset of stored obligations based on a result of the analyzing;

identifying, from the plurality of controls, one or more controls that have been implemented in one or more software processes to mitigate risks associated with the subset of stored obligation as control candidates for the first obligation; and providing, on the user device, a graphical user interface (GUI) that displays the control candidates for the first obligation.

16. The non-transitory machine-readable medium of claim 15, wherein the operations further comprise:

receiving a selection of at least one control from the control candidates via the GUI; and implementing the at least one control within the software process of the online service provider.

17. The non-transitory machine-readable medium of claim 16, wherein the operations further comprise:

generating software code corresponding to the at least one control based on a format corresponding to a source code of the software process; and integrating the software code into the software process.

18. The non-transitory machine-readable medium of claim 16, wherein the analyzing uses one or more machine learning models, and wherein the operations further comprise:

providing the selection of the at least one control as a feedback to re-train the one or more machine learning models.

19. The non-transitory machine-readable medium of claim 15, wherein the analyzing comprises performing a multi-dimensional attribute analysis, and wherein the operations further comprise:

generating a multi-dimensional space having a plurality of dimensions corresponding to the set of attribute types;

determining, for the first obligation, a first position within the multi-dimensional space based on the set of attributes associated with the first obligation; and determining, for each corresponding one of the plurality of stored obligations, a corresponding second position within the multi-dimensional space based on attributes associated with the corresponding one of the plurality of stored obligations.

20. The non-transitory machine-readable medium of claim 19, wherein the operations further comprise:

determining, for each corresponding one of the plurality of stored obligations, a distance between the first position and the corresponding second position within the multi-dimensional space; and selecting, from the plurality of stored obligation, the subset of stored obligations having the distances below a threshold.

* * * * *